US007479918B2

(12) United States Patent
Johnson et al.

(10) Patent No.: US 7,479,918 B2
(45) Date of Patent: Jan. 20, 2009

(54) VEHICLE-MOUNTED ULTRA-WIDEBAND RADAR SYSTEMS AND METHODS

(75) Inventors: Patrick W. Johnson, Jefferson, MD (US); Bomono A. Emessiene, Germantown, MD (US)

(73) Assignee: Zimmerman Associates, Inc., Fairfax, VA (US)

( * ) Notice: Subject to any disclaimer, the term of this patent is extended or adjusted under 35 U.S.C. 154(b) by 136 days.

(21) Appl. No.: 11/603,241

(22) Filed: Nov. 22, 2006

(65) Prior Publication Data

US 2008/0117098 A1 May 22, 2008

(51) Int. Cl.
*G01S 13/89* (2006.01)
(52) U.S. Cl. .................. 342/22; 342/27; 342/25 A; 342/179; 89/1.13
(58) Field of Classification Search .......... 342/22, 342/25 R, 25 A, 25 F, 27, 90, 179; 89/1.13
See application file for complete search history.

(56) References Cited

U.S. PATENT DOCUMENTS

| 5,673,050 | A  | * | 9/1997  | Moussally et al. | ............ | 342/22 |
| 5,969,661 | A  | * | 10/1999 | Benjamin | .................... | 342/22 |
| 7,345,618 | B1 | * | 3/2008  | Cole et al. | .................... | 342/22 |
| 7,382,312 | B2 | * | 6/2008  | Hintz | .......................... | 342/90 |
| 2004/0232329 | A1 | * | 11/2004 | Biggs | .......................... | 250/306 |
| 2007/0241954 | A1 | * | 10/2007 | Hintz | .......................... | 342/90 |
| 2008/0117098 | A1 | * | 5/2008  | Johnson et al. | ............ | 342/25 F |

OTHER PUBLICATIONS

"System description of a stepped frequency CW radar for humanitarian demining", van Genderen, P.; Nicolaescu, I. Advanced Ground Penetrating Radar, 2003. Proceedings of the 2nd International Workshop on May 14-16, 2003 (s): 9-15.*
Kositsky, et al., "Results from a Forward-Looking GPR Mine Detection System," Proceedings of SPIE, vol. 4394, 2001, pp. 700-711.
Gorman, "Analysis of Sensor Integration of the Integrated Ground Mobile Mine Detection Testbed (IGMMDT)," SPIE vol. 3079, pp. 443-450.
Jakobsen et al., "Stepped-Frequency Ground-Penetrating Radar for Detection of Small Non-Metallic Buried Objects," SPIE vol. 3079, pp. 538-542.
Chant et al., "Ultra-Wide-Band Radar Echoes of Land Mine Targets Measured at Oblique Incident Using a 250 kW Impulse Radar System," SPIE vol. 3079, pp. 543-554.
Altshuler et al., "Mine and UXO Detection: Measures of Performance and Their Implication in Real-World Scenarios," SPIE vol. 3079, pp. 281-292.

* cited by examiner

*Primary Examiner*—John B Sotomayor
(74) *Attorney, Agent, or Firm*—Nixon & Vanderhye P.C.

(57) ABSTRACT

Vehicle-mounted UWB systems and/or methods for detecting mines and other explosive devices are provided. In certain exemplary embodiments, a system for detecting non-buried mines and/or improvised explosive devices is provided. Distance measuring equipment may be configured to track movement of the system. Substantially forward-looking bistatic antenna transceivers may be capable of collecting range-magnitude radar data over two channels. A first transceiver may capture radar data for a first area, and a second transceiver may capture radar data for a second area. A processor may be configured to: derive range resolution data and cross-range resolution data from the range-magnitude radar data; focus the range resolution data and the cross-range resolution data, based at least on the distance data and an antenna beamwidth pattern associated with the antenna transceivers; and, "and" data for portions of the first area and the second area that overlap.

20 Claims, 29 Drawing Sheets

VEHICLE-MOUNTED ULTRA-WIDEBAND RADAR SYSTEMS AND METHODS

STATEMENT REGARDING FEDERALLY SPONSORED RESEARCH OR DEVELOPMENT

The U.S. Government may have a paid-up license in this invention and the right in limited circumstances to require the patent owner to license others on reasonable terms as provided for by the terms of one or more of Contract No. N68335-01-C-0160 awarded by the United States Navy, Contract No. DAAB07-03-D-C213 awarded by the United States Army, and/or under sub-contract SUB1276632CCC.

FIELD

The exemplary embodiments described herein relate to vehicle-mounted ultra-wideband (UWB) radar systems and methods and, more particularly, the exemplary embodiments described herein relate to vehicle-mounted UWB systems and methods for detecting mines and other explosive devices.

BACKGROUND AND SUMMARY

A landmine is a type of self-contained explosive device, typically placed onto or into the ground, which explodes when triggered by a vehicle, person, animal, etc. Similarly, an improvised explosive device (IED) is an explosive device often used in unconventional warfare by terrorists, guerrillas, or commando forces. Insurgents in Iraq have made the IED (often referred to simply as roadside bombs) one of their main weapons against coalition forces. Indeed, some reports estimate that most casualties in Iraq have been the result of IEDs.

Landmines and IEDs are typically lethal and often difficult to detect. Landmines and IEDs are difficult to find and disarm, in large part because of their size, construction, and often irregular placement. In 2005 alone, the U.S. military spent $3.3 billion to defeat IEDS, concentrating their spending on improved armor for vehicles and soldiers and better technology, such as sensors, radio jammers, and robotic bomb-disposal devices. But more and more landmines and IEDs are being deployed, often inflicting high numbers of casualties and low costs.

Thus, it will be appreciated that there is a need in the art to for improved techniques for detecting landmines and/or improvised explosive devices.

One aspect of certain exemplary embodiments relates to techniques for detecting buried, non-buried, and/or partially buried on- and/or off-route mines and/or improvised explosive devices.

Another aspect of certain exemplary embodiments relates to techniques for detecting buried or non-buried on- or off-route mines and/or improvised explosive devices at a standoff distance of approximately 300 feet while traveling at a speed of approximately 25 kilometers per hour.

Yet another aspect of certain exemplary embodiments relates to detecting non-buried on- or off-route mines and/or improvised explosive devices using substantially forward-looking bistatic antenna transceivers capable of operating over two channels.

According to certain exemplary embodiments, a method of detecting non-buried mines and/or improvised explosive devices is provided. Distance data may be tracked. Range-magnitude radar data may be collected from substantially forward-looking bistatic antenna transceivers capable of operating over two channels. A first transceiver may capture radar data from a first area, and a second transceiver may capture radar data from a second area. Range resolution data and cross-range resolution data may be derived from the range-magnitude radar data. The range resolution data and the cross-range resolution data may be focused, based at least on the distance data and an antenna beamwidth pattern associated with the antenna transceivers. Data for portions of the first area and the second area that overlap may be anded (e.g. in a stereoscopic manner to improve cross-range resolution).

According to certain other exemplary embodiments, a system for detecting buried or non-buried mines and/or improvised explosive devices is provided. Distance measuring equipment may be configured to track movement of the system. Substantially forward-looking bistatic antenna transceivers may be capable of collecting range-magnitude radar data over two channels. A first transceiver may capture radar data for a first area, and a second transceiver may capture radar data for a second area. A processor may be configured to: derive range resolution data and cross-range resolution data from the range-magnitude radar data; focus the range resolution data and the cross-range resolution data, based at least on the distance data and an antenna beamwidth pattern associated with the antenna transceivers; and, "and" data for portions of the first area and the second area that overlap.

BRIEF DESCRIPTION OF THE DRAWINGS

These and other features and advantages will be better and more completely understood by reference to the following detailed description of exemplary illustrative embodiments in conjunction with the drawings, of which.

DETAILED DESCRIPTION

Figure 1:
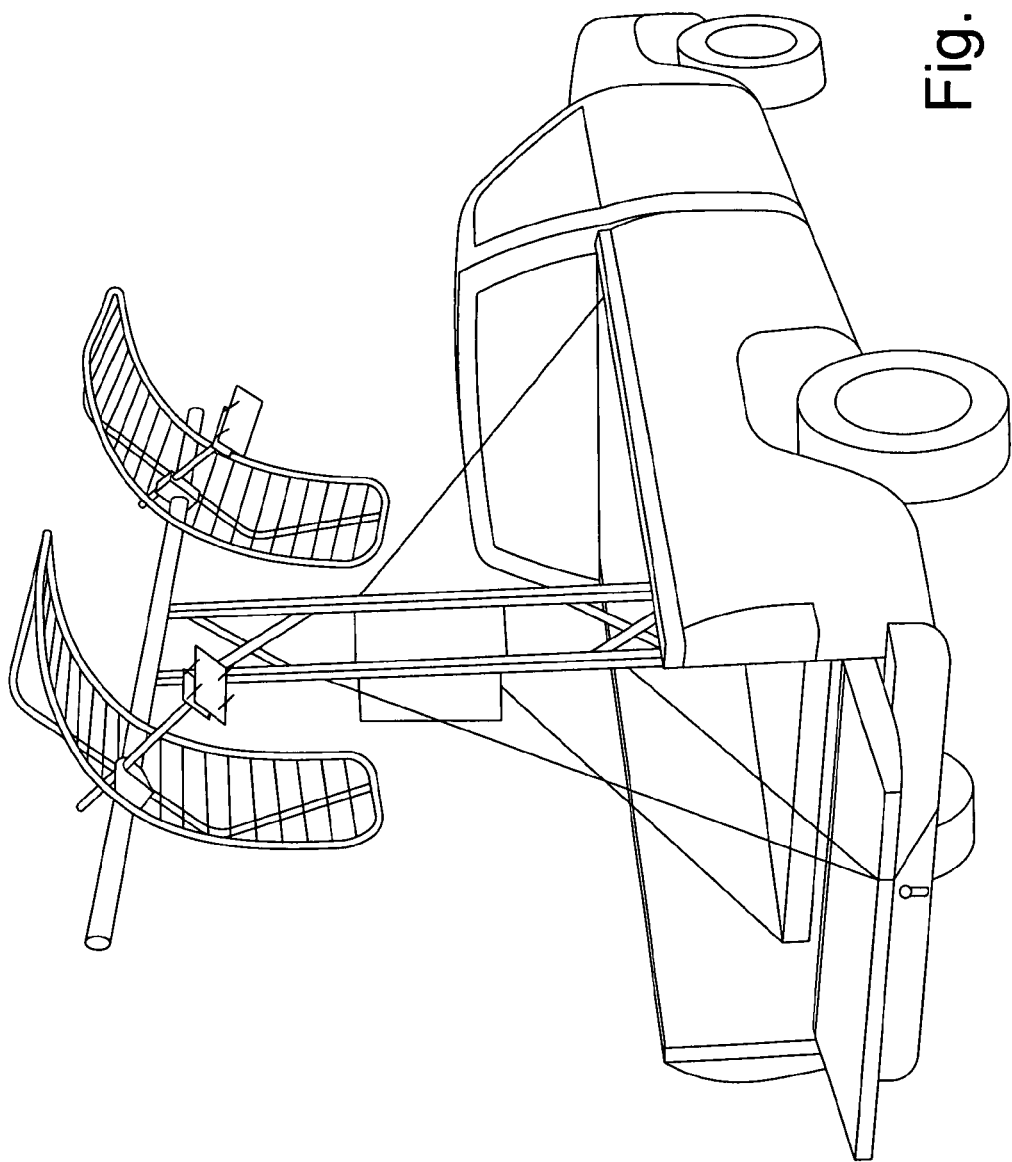
FIG. 1 shows an early prototype of an antenna system mounted on a pickup truck to simulate a UAV.

Referring now more particularly to the drawings, FIG. 1 shows an early prototype of an antenna system mounted on a pickup truck to simulate a UAV. This prototype used a single transceiver in a single channel mode with one bistatic pair of antennas, and was designed to detect the presence of Scud missile launchers in heavy woods. The motion of the platform was used in combination with a side-looking antenna to form a virtual or synthetic aperture. In general, a larger synthetic aperture provides a better azimuthal resolution. With the radar antenna looking directly to the side, the width of the synthetic aperture is optimized. For the airborne version of this technology, this is the most advantageous arrangement. However, for a vehicle mounted implementation, the radar antennas must be pointed further forward to detect the target before the platform enters the lethal range of the potential threat. As the antennas are pointed further forward, the extent of the virtual aperture is decreased. At a look angle of 45 degrees off of the motion of the platform, the effective synthetic aperture is reduced by approximately 30%. This reduction in the synthetic aperture results in a significant broadening of the resulting processed beamwidth and, subsequently, a degradation of the azimuthal resolution. As the look angle of the radar antenna is pointed closer to the direction of the host platform motion, the azimuthal or cross-range resolution is further degraded. Experiments have indicated that a look angle of approximately 20 degrees is required to detect an improvised explosive device (IED) threat located immediately at the side of the road. At this look angle, the target can be detected, but the resulting azimuthal resolution is insufficient to establish an accurate geolocation.

Figure 2:
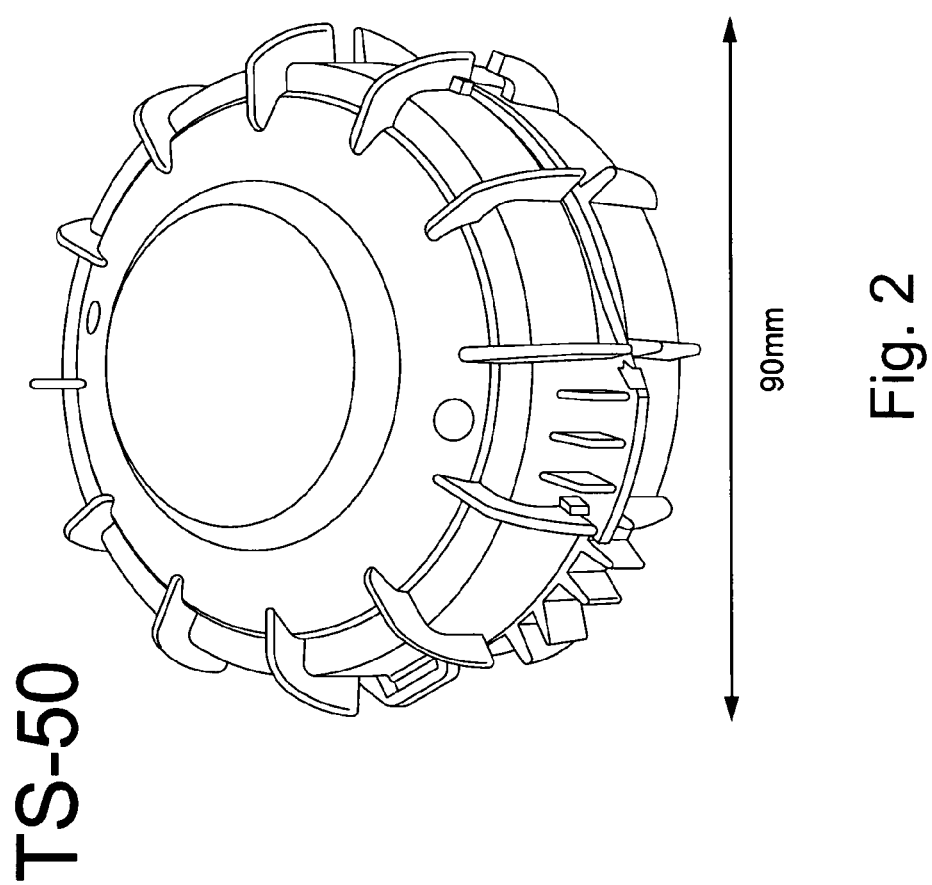
FIG. 2 shows a TS-50 landmine.
Figure 3:
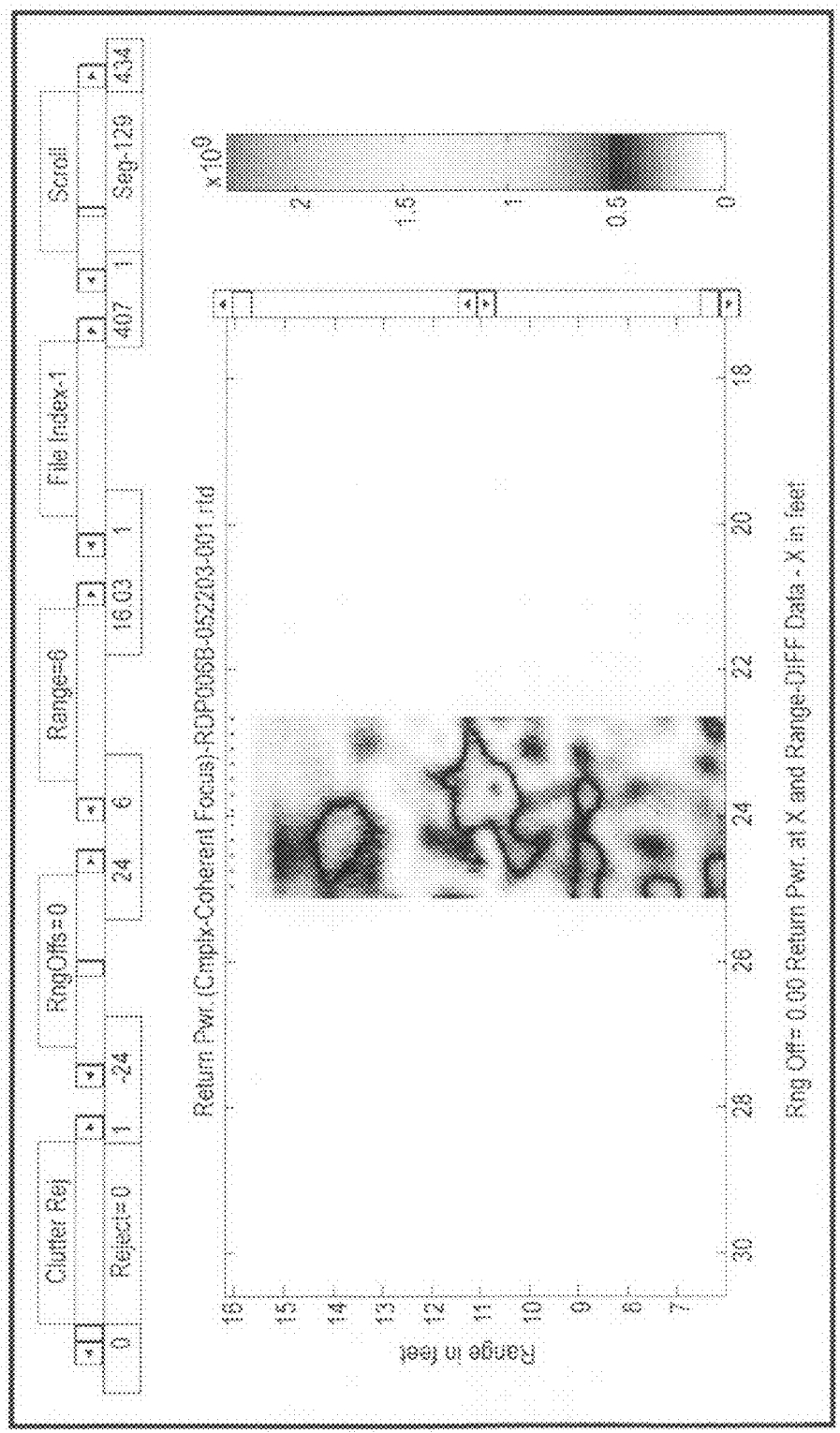
FIG. 3 is a radar image of a TS-50 buried mine.

This first prototype initially was modified to detect a TS-50 plastic anti-personnel buried landmine, shown in FIG. 2. The diameter of a TS-50 landmine is approximately 90 mm (approximately 3 in.). Currently, it is believed that there are approximately 50 million TS-50 landmines deployed worldwide. They are available from six different countries for approximately $6 apiece. Their location is difficult to detect, as the only significant amount of metal is in the actual striker. TS-50 landmines typically are found and swept manually by a human minesweeper with a sharp stick or bayonet wearing a Plexiglas faceshield. FIG. 3 is a radar image of a TS-50 buried mine.

While TS-50 buried landmines remain a significant threat, the more current threat (especially in Iraq) involves off-route non-buried IEDs. In particular, the MON-100 anti-personnel landmine may sit approximately 10-30 meters from the side of the road and emit a plasma jet capable of penetrating 3 in. of armor. Accordingly, a first set of new experiments involved developing a system for vehicle-mounted forward-looking off-route non-buried IED detection.

Figure 4:
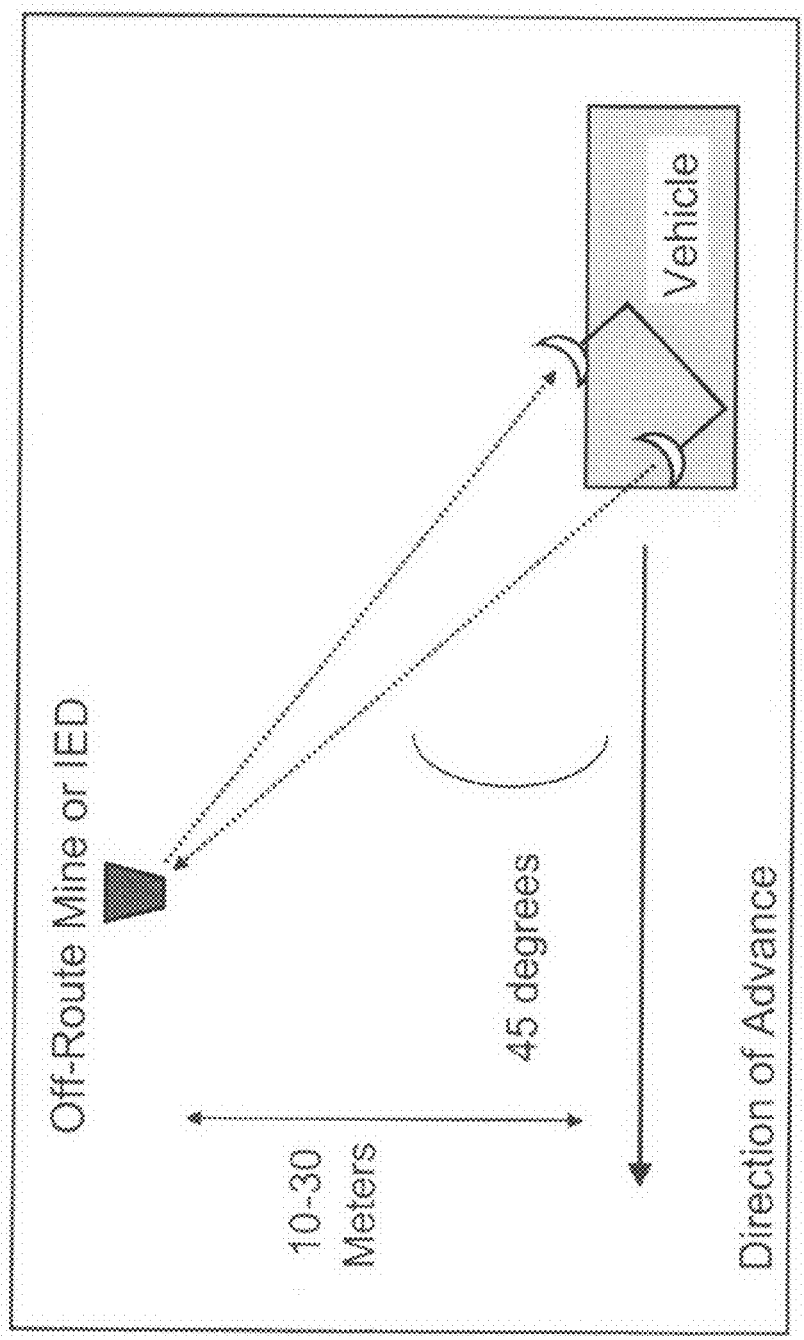
FIG. 4 shows the operational concept for a system for vehicle-mounted forward-looking non-buried IED detection 10 to 30 meters off-route.

FIG. 4 shows the operational concept for a system for vehicle-mounted forward-looking non-buried IED detection 10 to 30 meters off-route. Optimally, as noted above, the radar antennas would be pointed directly to the side to maximize the synthetic aperture. Unfortunately, this arrangement is not feasible because the vehicle would be within the lethal range by the time the IED would be detected. To overcome this problem, the antennas may be pointed 45 degrees off of the velocity vector, as shown in FIG. 4.

Figure 5:
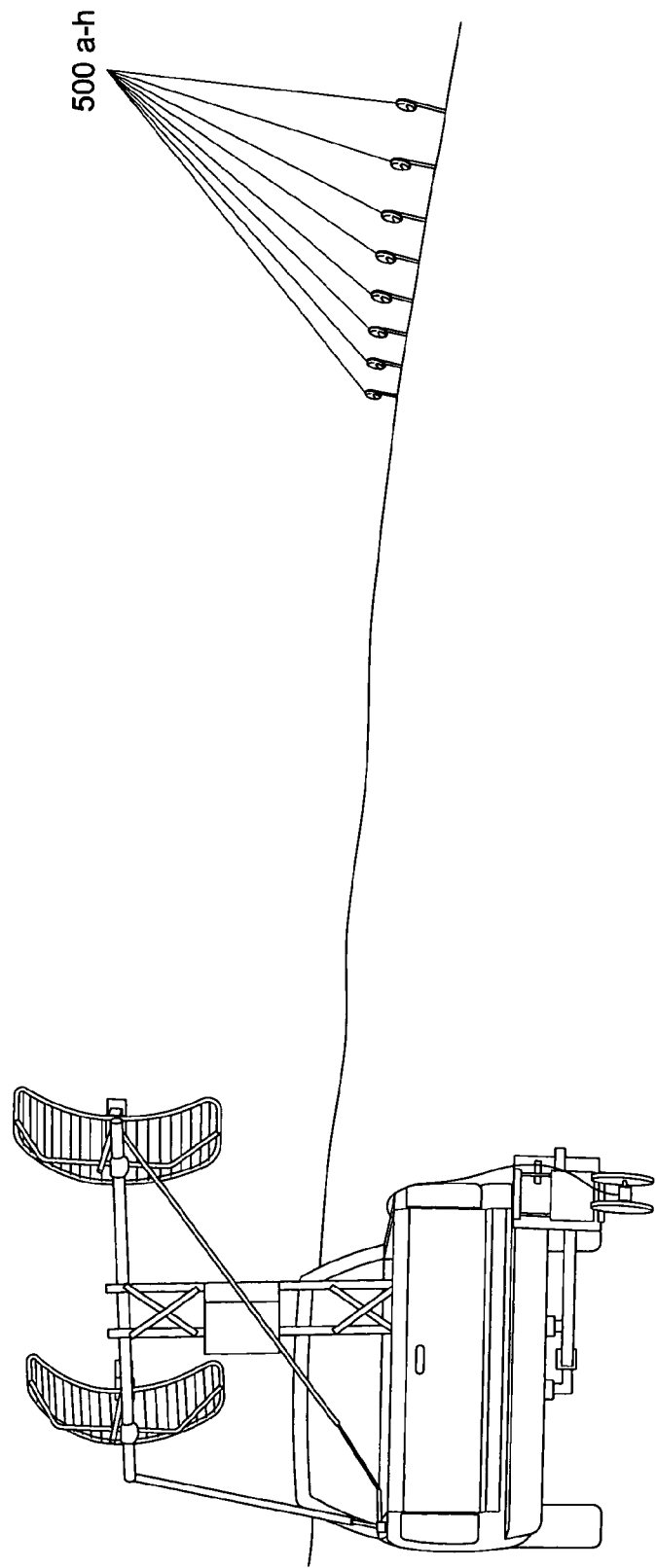
FIG. 5 shows a field test of a system designed according to the operational concept of FIG. 4.

FIG. 5 shows a field test of a system designed according to the operational concept of FIG. 4. The antennas are pointed 45 degrees off of the velocity vector. There are eight targets 500a-h in the form of garbage can lids, which is an approved simulant for the MON-100 type mine.

Figure 6:
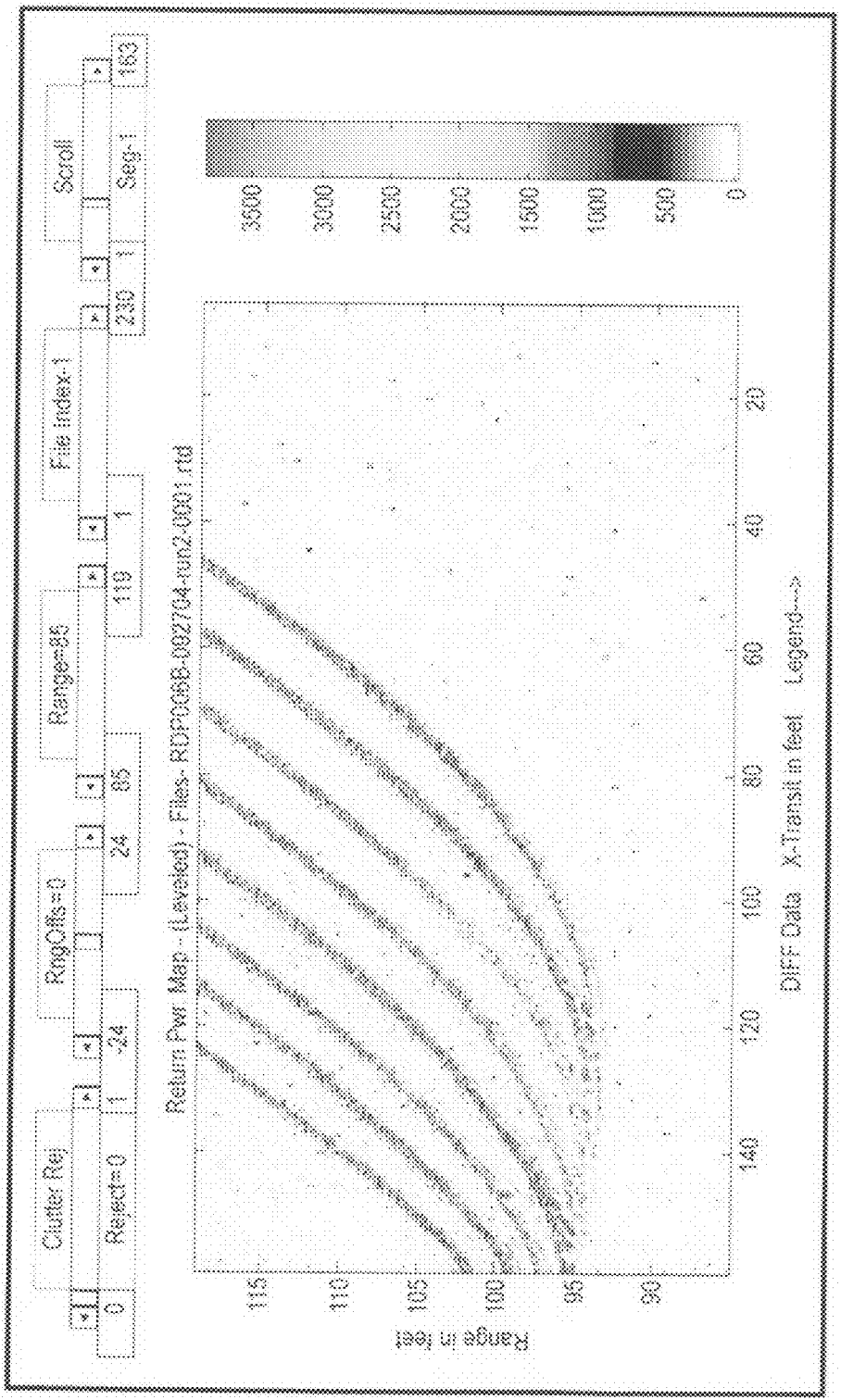
FIG. 6 shows the raw target data from the radar antennas from the field test shown in FIG. 5.

FIG. 6 shows the raw target data from the radar antennas from the field test shown in FIG. 5. The chart in FIG. 6 reflects a series of radar snapshots taken every 3 inches. More particularly, 300 range-magnitude files of radar snapshots (with over 3,000 data points in each file) are taken every second. The vehicle moves from right-to-left. The antenna beamwidth is very wide and, in particular, because the beamwidth is ±45 degrees, the target is somewhere within a 90 degree range. Accordingly, the bearing information is highly ambiguous, and the only accurate information is range. The first target really is at about 93 ft. The maximum range of the antenna (e.g. the slant range) is set for 120 ft., meaning that the first target becomes visible at a location of the truck at a distance of about 50 ft. down the range. The first four targets become just visible at approximately 80 ft. Although it may be possible to tell roughly where the targets are, it is greatly advantageous to focus the data.

Figure 7:
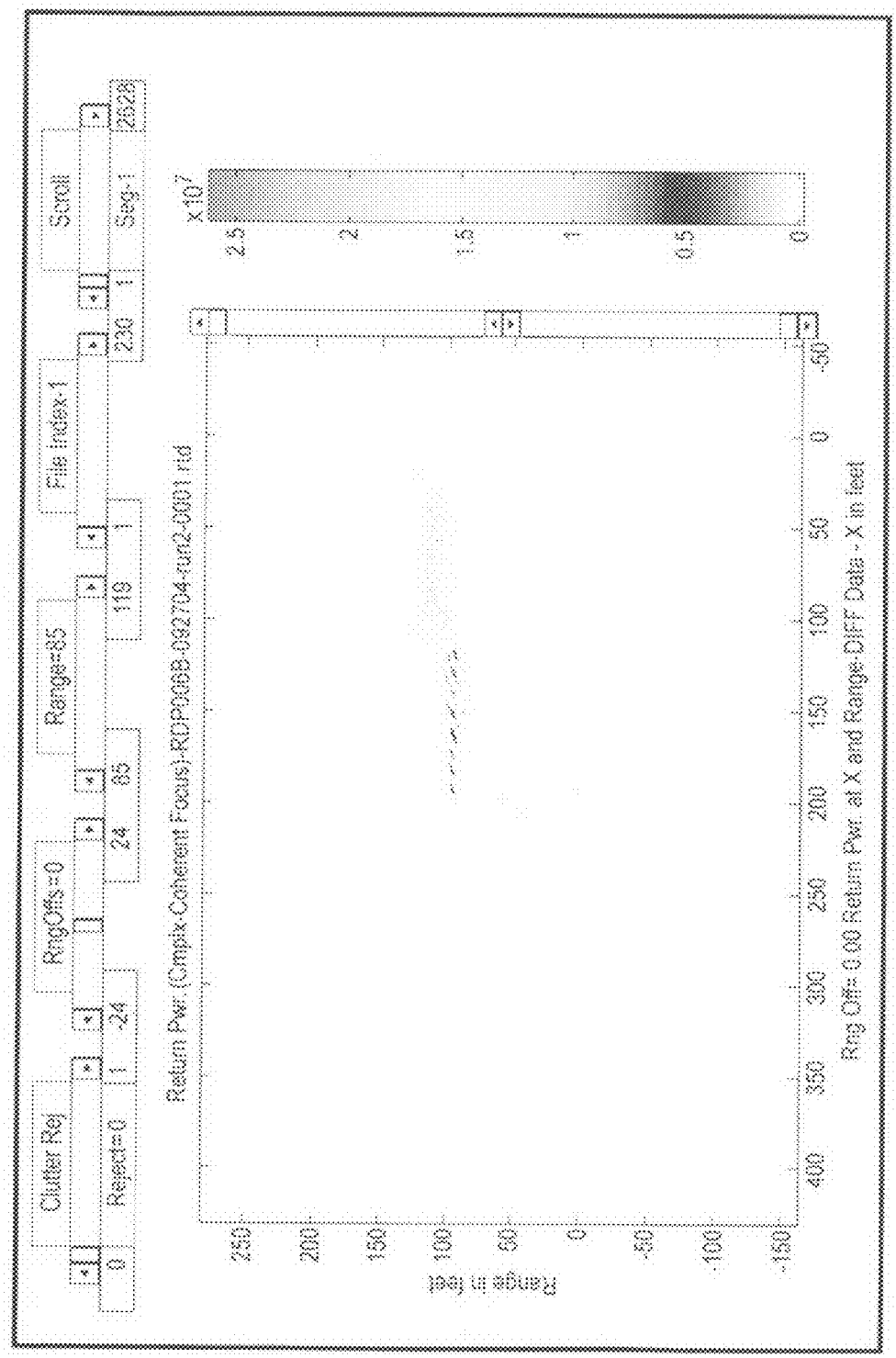
FIG. 7 focuses the raw data shown in FIG. 6 and shows the focused data in plan view.
Figure 8:
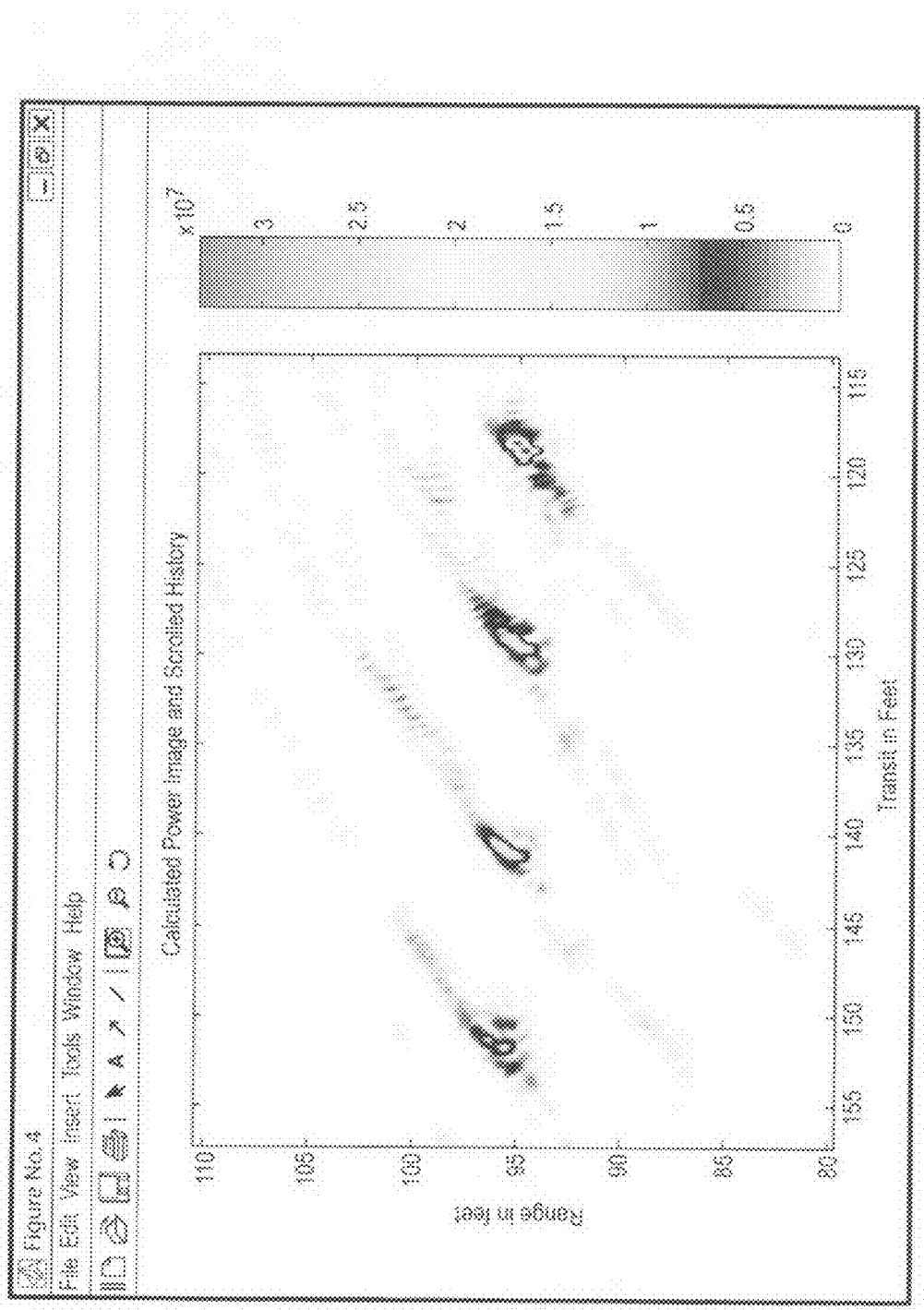
FIG. 8 is an enlargement of the first four targets shown in FIG. 7.

FIG. 7 focuses the raw data shown in FIG. 6 and shows the focused data in plan view. The focusing process is enabled by the range accuracy of 0.015 ft., which implies a cross-range resolution of better than 3 in. After the focusing is completed, the brightest target has over 250 million "hits." FIG. 8 is an enlargement of the first four targets shown in FIG. 7. As can be appreciated from FIG. 8, the data is nearly accurate enough to indicate the actual side of garbage can lid used in the field test.

Figure 9:
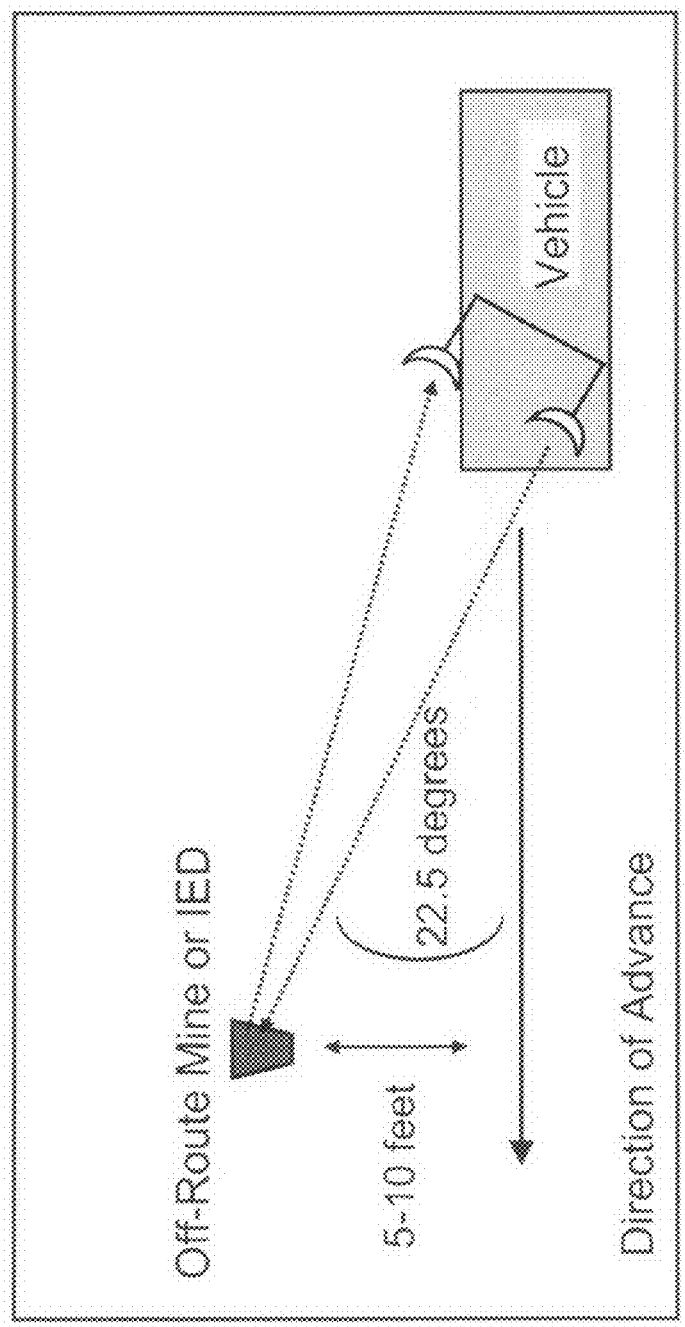
FIG. 9 shows the operational concept for a system for vehicle-mounted forward-looking non-buried IED detection 5 to 10 ft. off-route.

Although this prototype was successful, not all mines and/or IEDs are so far off-route. For example, 155 mm projectiles may lay only 5 to 10 ft. off-route. Similar to the disadvantages discussed above, antennas disposed at 45 degree angles would not detect such mines or IEDs before the vehicle enters the lethal range. FIG. 9 shows the operational concept for a system for vehicle-mounted forward-looking non-buried IED detection 5 to 10 ft. off-route. The antennas may be pointed 22.5 degrees off of the velocity vector. Also, it is advantageous to lower the antennas because the elevation beam can be focused to direct more radar energy onto the non-buried target. Additionally, because the targets are not buried, the need to locate the antennas high and look downward is reduced, thereby improving the signal-to-noise ratio (SNR).

Figure 10:
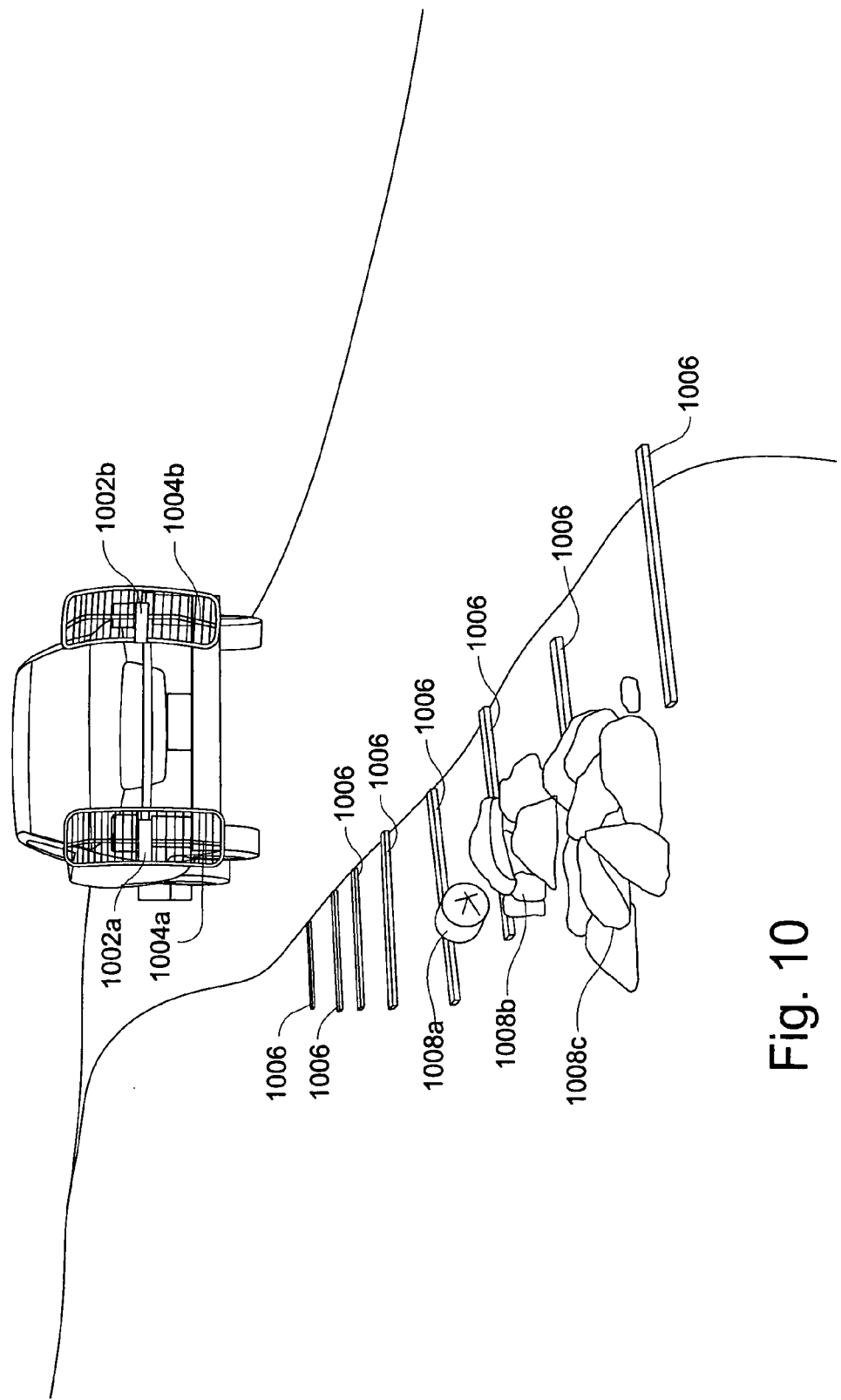
FIG. 10 is a field test of the a system built according to the operational concept of FIG. 9.

FIG. 10 is a field test of the system built according to the operational concept of FIG. 9. The antennas are mounted on a common carrier board. In this particular illustrative arrangement, transmit antennas 1002a-b and send/receive antennas 1004a-b are located on the front bumper. Position determining means (not shown) are mounted to the rear bumper, and a laptop (also not shown) is located within the truck. The stakes 1006 are set 10 ft. apart. The three mounds 1008a-c are, respectively, a 155 mm projectile, a 155 mm projectile buried a pile of rocks, and just a pile of rocks.

Figure 11:
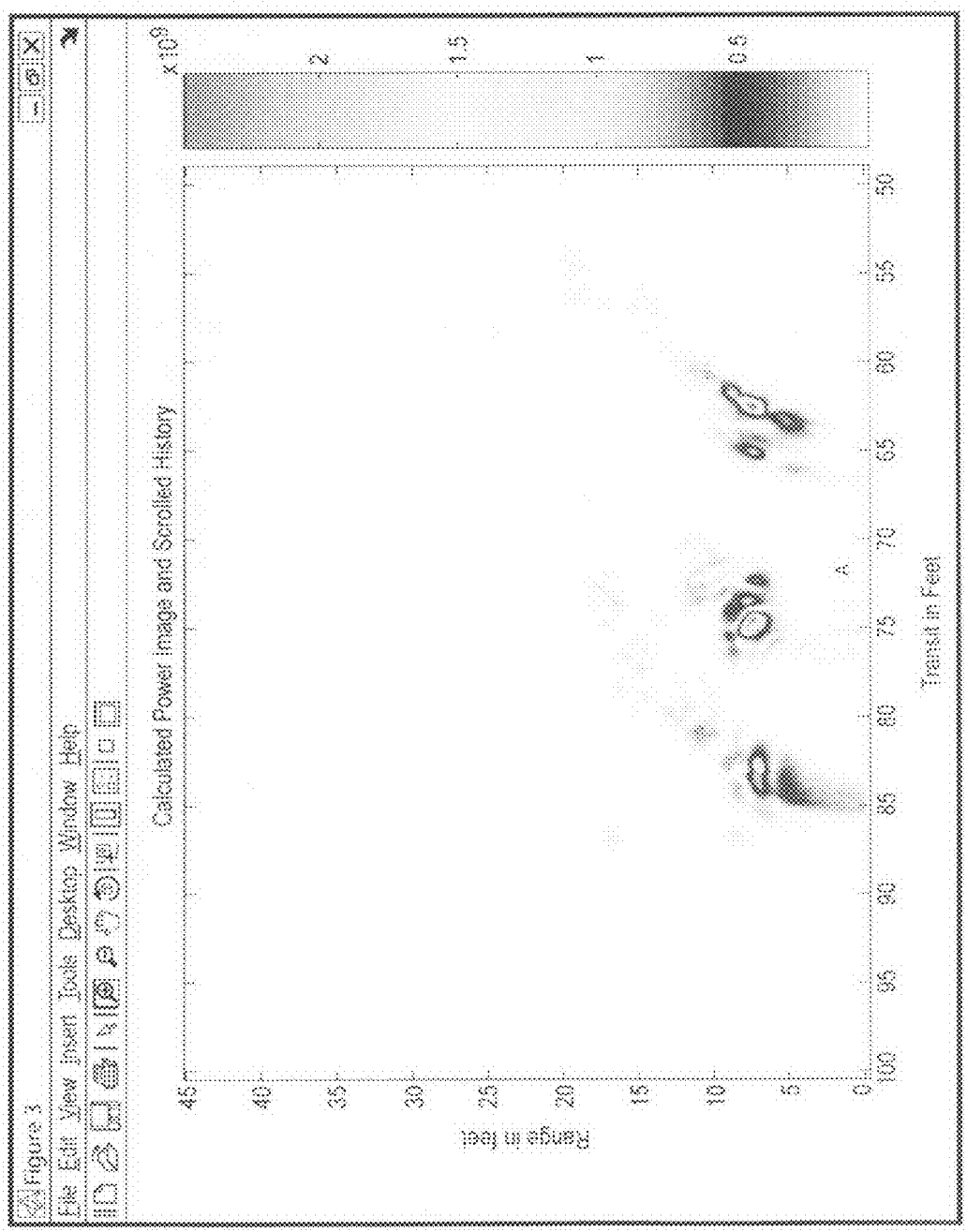
FIG. 11 is an enlarged view of focused radar data.

FIG. 11 is an enlarged view of focused radar data. Moving right to left, the data indicate a 155 mm projectile, a 155 mm projectile buried a pile of rocks, and just a pile of rocks. The 155 mm projectile shown farthest right has almost 1 billion "hits," indicating that a high degree of radar energy and/or power is focused onto the targets.

Figure 12:
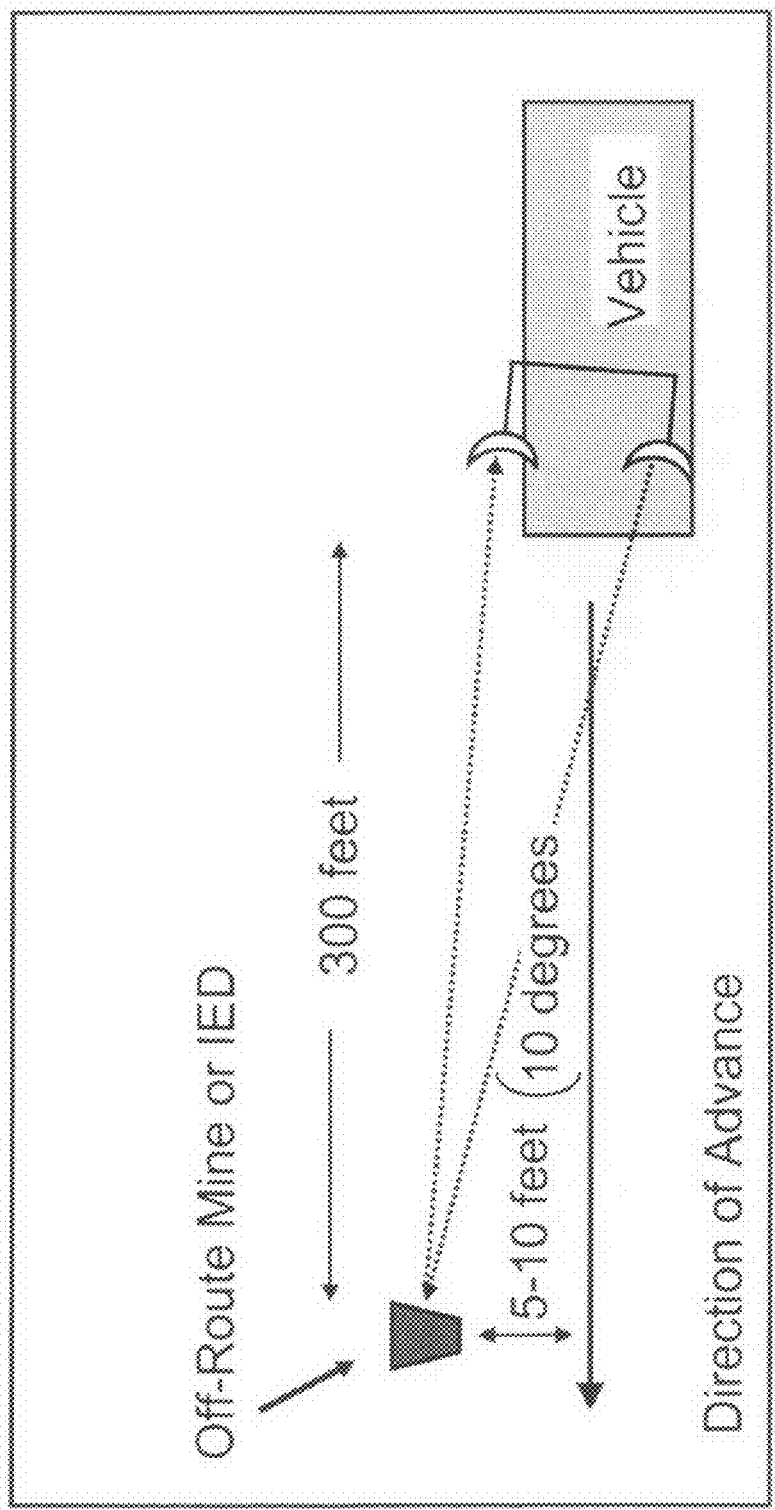
FIG. 12 shows the operational concept for a system for vehicle-mounted forward-looking off-route non-buried IED detection 5 to 10 ft. off-route at a distance of 300 ft.

It is desirable to look yet further down the road. Thus, FIG. 12 shows the operational concept for a system for vehicle-mounted forward-looking off-route non-buried IED detection 5 to 10 ft. off-route at a distance of 300 ft. The power of the antennas was boosted 20 dB, and receiver sensitivity was increased 10 dB. The antennas functioned in the range of 3-5 GHz, in part because the 1-3 GHz range is reserved to protect GPS. In particular, smaller, higher gain antennas were used to enable the angle to be reduced to only 10 degrees.

Figure 13:
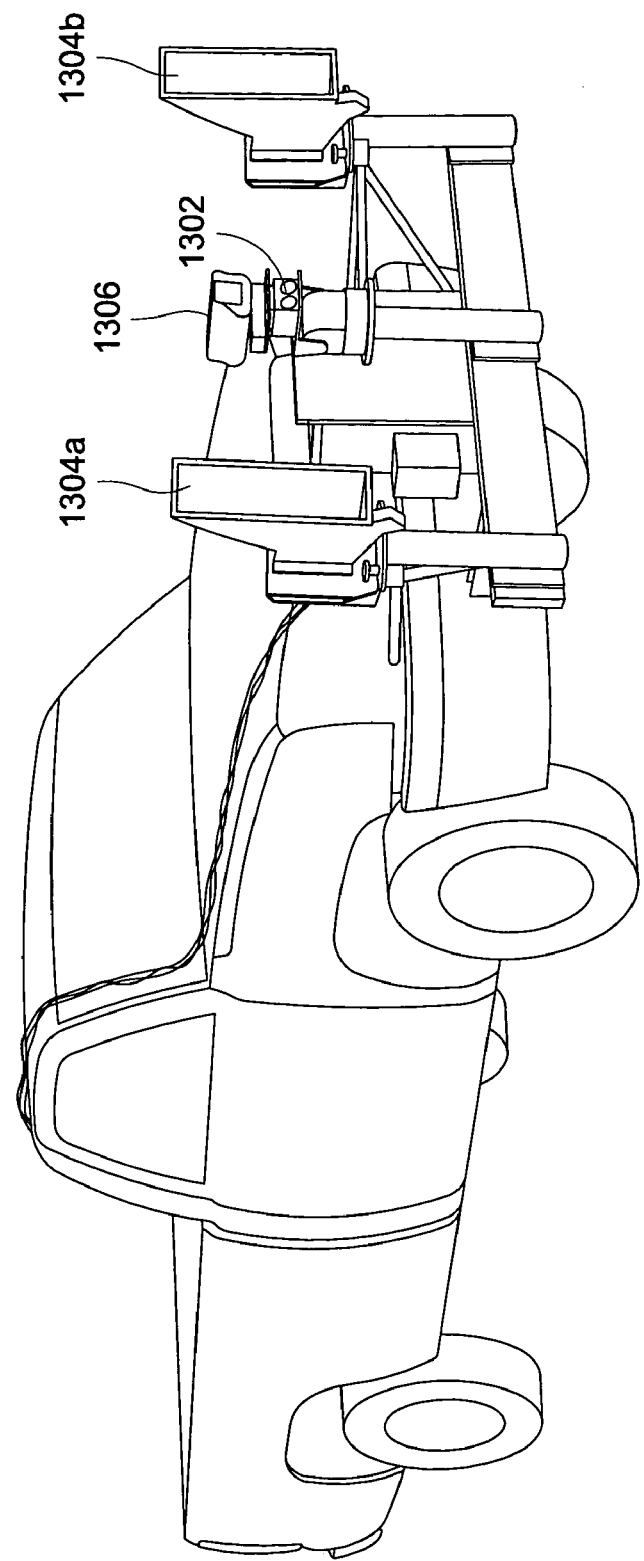
FIG. 13 shows a prototype of a system built according to the operational concept of FIG. 12.

FIG. 13 shows a prototype of a system built according to the operational concept of FIG. 12. A laser rangefinder 1302 located collinearly with the transmit and receive antennas 1304a-b increased the accuracy of the location-determining means. A standard pan-tilt/zoom video camera 1306, also located collinearly with the transmit and receive antennas 1304a-b, provided a customizable view to the system operator via a 5 in. display located on the vehicle (not shown).

The system operator also may view a GPS and/or GIS moving map via the on-board computer interface. Via the interface, the operator may, for example, mark the maps, insert color codes, etc. to signal detected mines, false alarms, alert removal teams, etc.

The design goal of this prototype was to begin detecting and processing data from a distance of 300 ft. when traveling at 25 kilometers per hour, with a file throughput of 100 files per second. A radar snapshot would be taken every 3 in., which has been experimentally determined to provide sufficient accuracy. Enough data to form a radar image is captured as the vehicle moves from 300 ft. from the target to 250 ft. from the target. The system processes that data during the next 50 ft. (250 ft. from the target to 200 ft. from the target). At 200 ft. from the target, the system will recognize the presence of a target and alert the operator (e.g. via an audible alarm, etc.). When the operator is alerted, the driver will stop. Conservatively, it will take the driver 50 ft. and a finite amount of time (in seconds) to stop. The system may transition to a graphics mode and allow the operator to, for example, mark the target, call for help, etc.

This prototype did not function in real-time. For example, it would collect data for 200 ft., stop, batch process the collected data, and move again. The software engineering choice of using Matlab as a programming language restricted the throughput to 3 files per second while, as noted above, 100 files per second are needed for high accuracy. Also, the antennas looked only to one side of the road. That is, there was no coverage of the other side of the road, and there was no coverage of the road itself. Moreover, the 10 degree angle greatly reduced (e.g. nearly eliminated) the virtual aperture. Thus, a smearing or spreading of cross-frames occurred, producing a smear instead of a point target because of the lack of azimuthal resolution. The azimuthal smear is especially large for targets proximate to the side of the road. Thus, further modifications were necessary to make this prototype truly viable in the field.

It can be shown mathematically that an antenna operating over a single channel will produce an azimuthal resolution of 24 in. Certain exemplary embodiments effectively clone this system and use two channels to improve the azimuthal resolution, thereby resulting in a two-channel stereoscopic system. The antennas may be pointed slightly outwardly. Thus, for example, a left antenna may cover the road and 20 ft. to the right of the road, and a right antenna may cover the road and 20 ft. to the left of the road. Thus, such illustrative configurations may result in the two-channel stereoscopic system of certain exemplary embodiments that covers 20 ft. to either side of the road with a bistatic pair antenna with both bistatic pair antennas covering the center of the road. An algorithm may focus the stereoscopic view of center of road, as the system operates like a two-channel "pushbroom SAR." A mathematical estimation indicates that a 6 ft. baseline provides a 2 in. azimuthal resolution. This is convenient for locating for vehicle mounting, for example, because the antenna elements may be located at the left and right edges of the front bumper of the vehicle.

Figure 14:
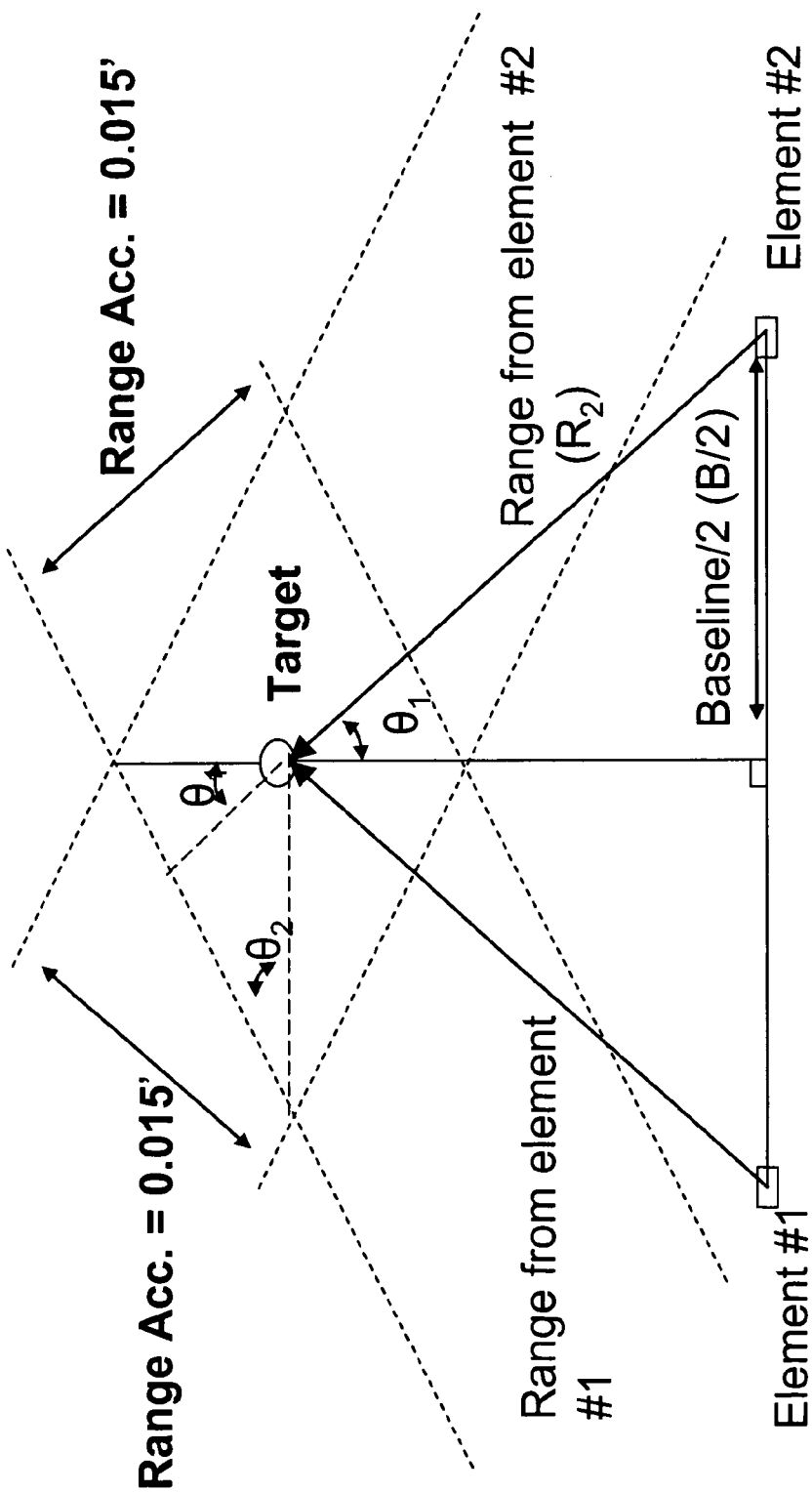
FIG. 14 is a representation of a two-channel azimuthal resolution geometry, in accordance with an example embodiment.

FIG. 14 is a representation of a two-channel azimuthal resolution geometry, in accordance with an example embodiment. The antenna elements are located at opposite ends of the baseline, and the dashed lines are parallel to the direction of the antenna elements. The range accuracy is 0.015 in. The computational goal is to find the distance along the y-axis to the target within the diamond. A 6 ft. baseline at 300 ft. yields a range resolution of approximately 2 in.

Figure 15:
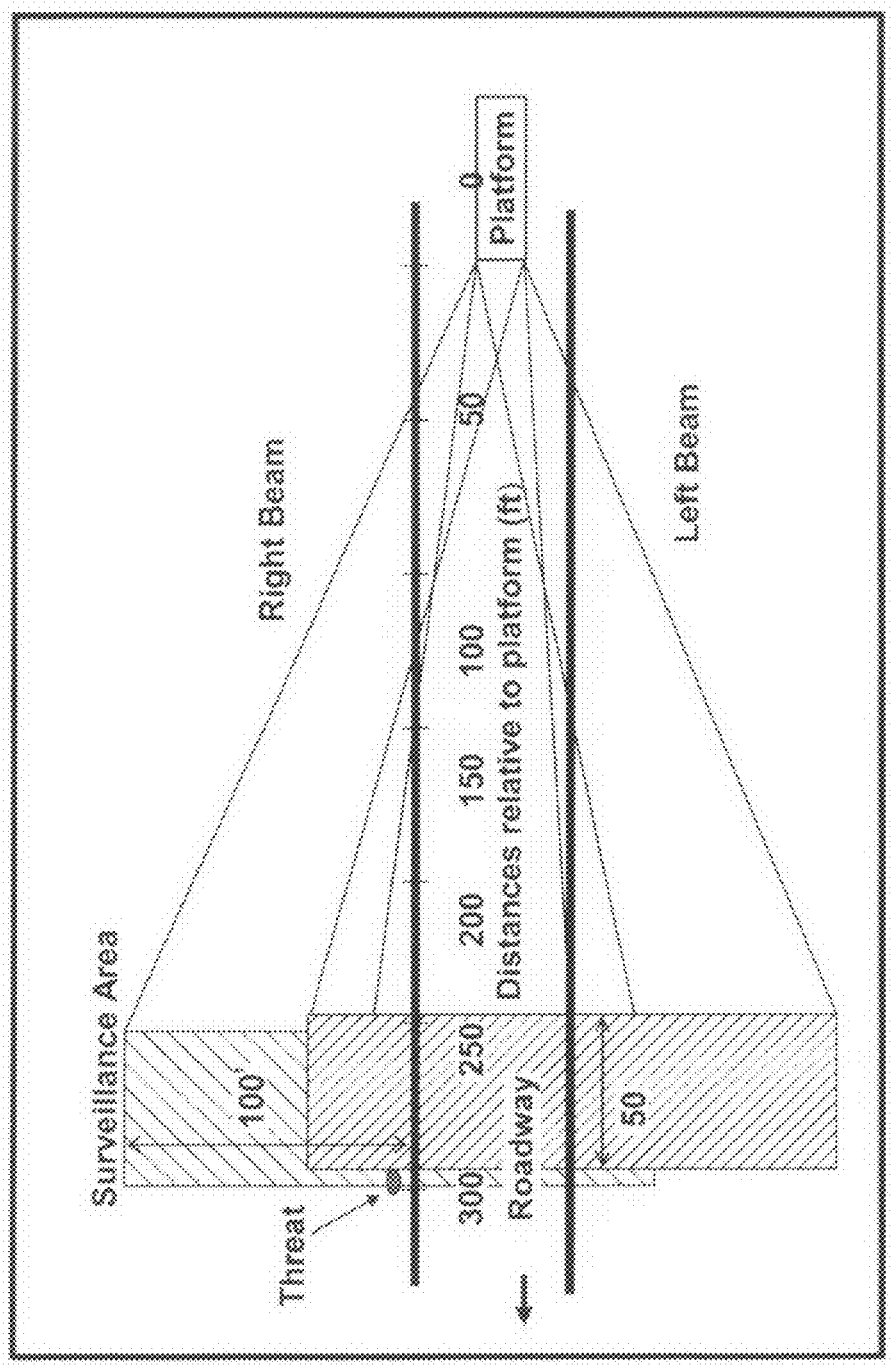
FIG. 15 shows the operational concept for a system for vehicle-mounted forward-looking non-buried IED detection for both sides of route and the route itself at a distance of 300 ft., in accordance with an exemplary embodiment.
Figure 16:
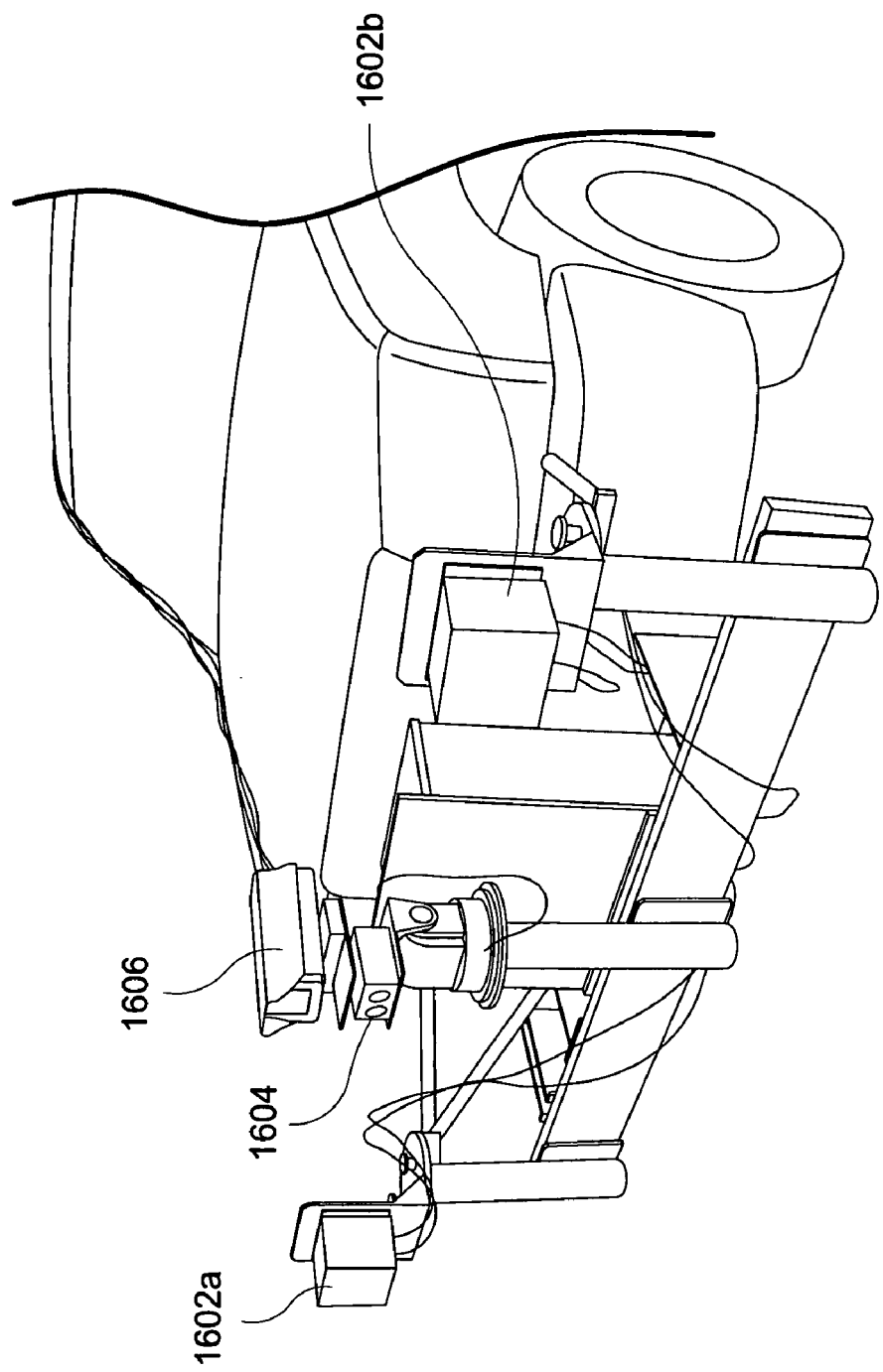
FIG. 16 shows a system according to an example embodiment.

FIG. 15 shows the operational concept for a system for vehicle-mounted forward-looking non-buried IED detection for both sides of route and the route itself at a distance of 300 ft., in accordance with an exemplary embodiment. As can be appreciated from FIG. 15, the right beam and left beam both extend 250 to 300 ft. along the velocity vector and up to 20 ft. off the velocity vector. The overlapping beams provide a stereoscopic view, though changes in the antennas are necessary to achieve a wider antenna azimuthal beamwidth. These changed antennas are means for lower gain which, in turn, allow for smaller, more efficient antennas. FIG. 16 shows a system according to an example embodiment. Each bistatic antenna pair 1602a-b includes two antennas (e.g. a transmit and a receive antenna on each side), which may function on two channels. A laser rangefinder 1604 and a video camera 1606 also are collocated.

Figure 17A:
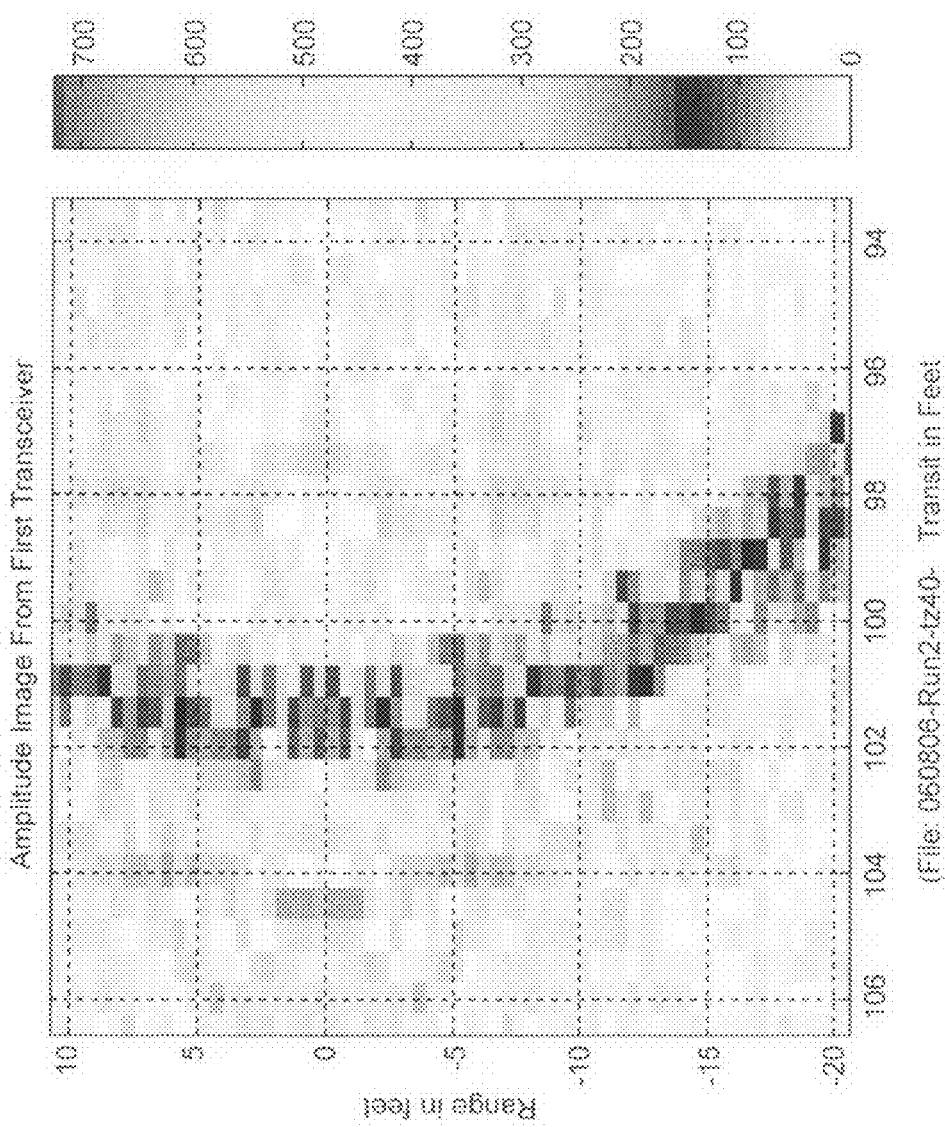
FIG. 17a is a left transceiver amplitude image of a first field test in which an exemplary embodiment was implemented.
Figure 17B:
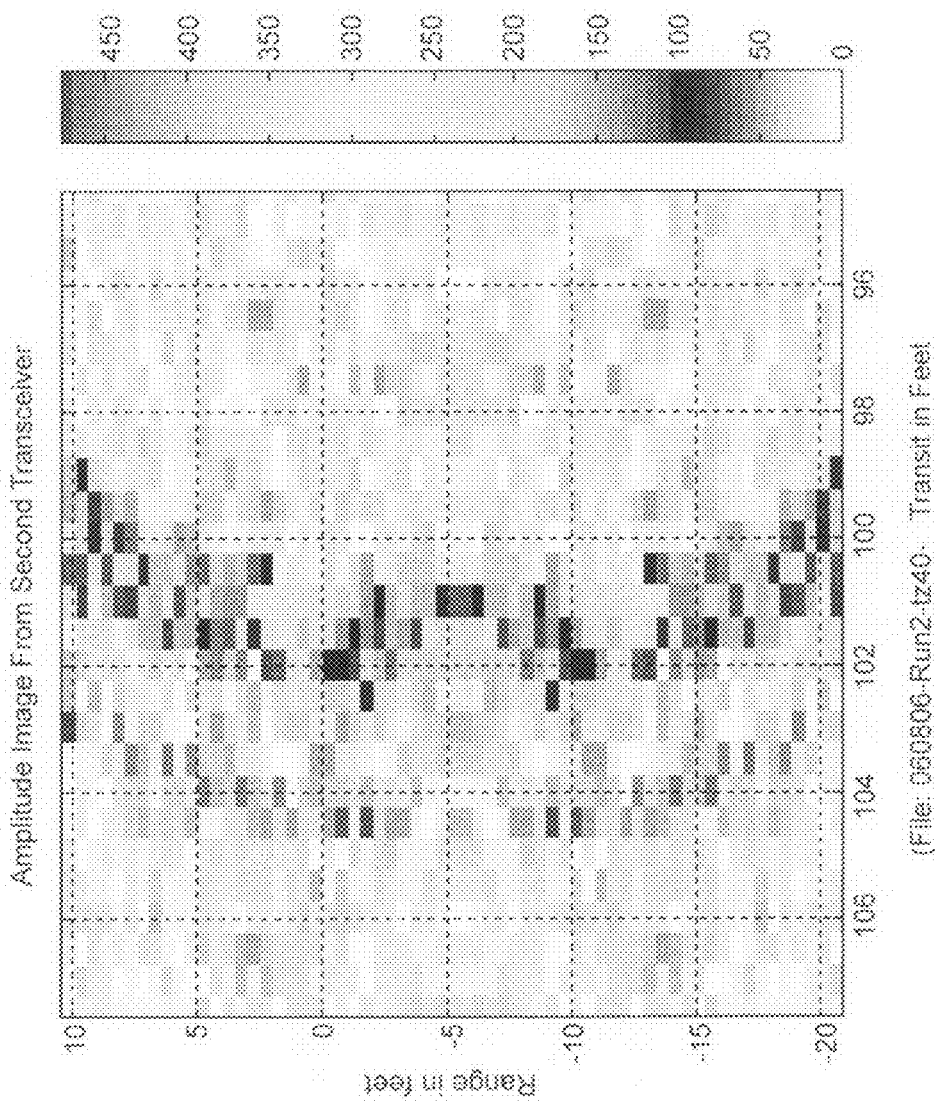
FIG. 17b is a right transceiver amplitude image of a first field test in which an exemplary embodiment was implemented.
Figure 17C:
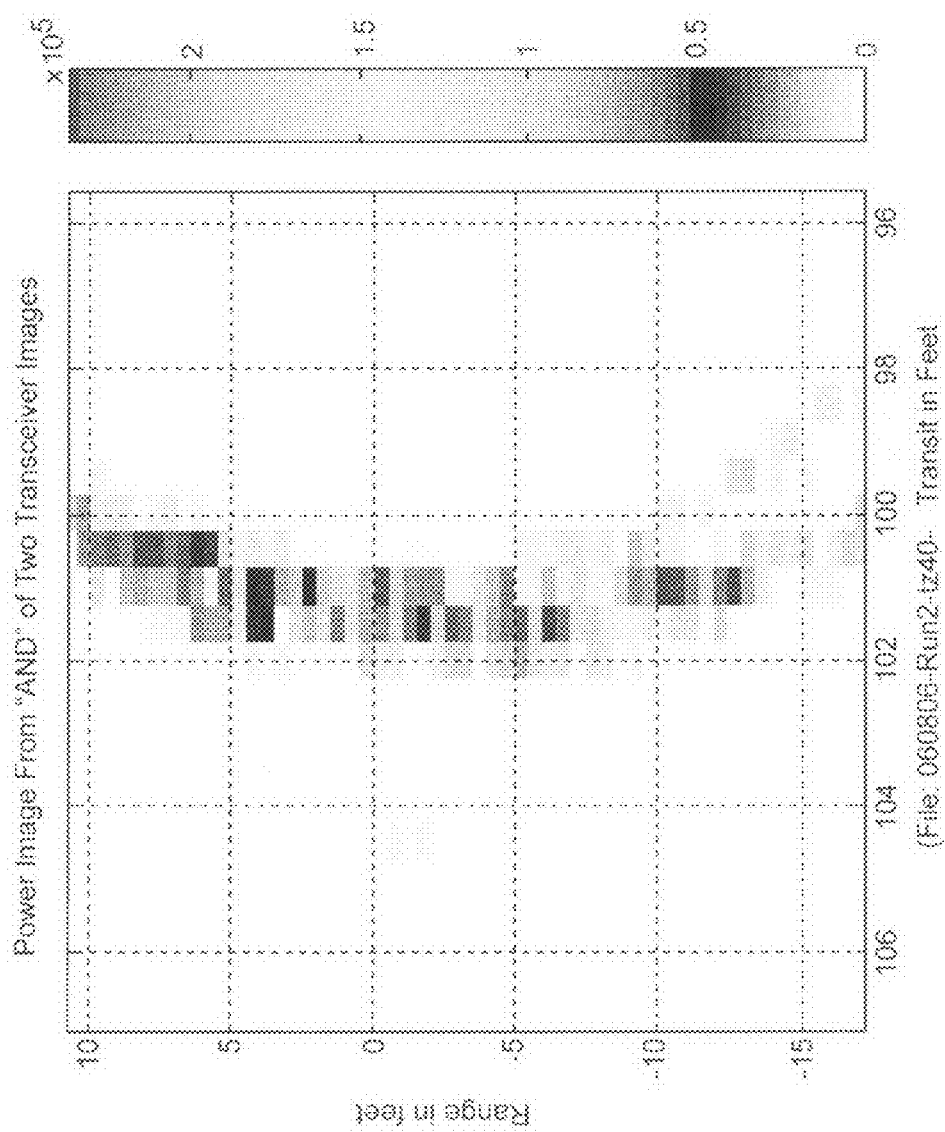
FIG. 17c represents the "anding" of FIGS. 17a and 17b, generated by processing.

FIG. 17a is a left transceiver amplitude image of a first field test in which an exemplary embodiment was implemented. The target appears approximately 100 ft. down the road, approximately at the center of the velocity vector. The azimuthal smear is evident. FIG. 17b is a right transceiver amplitude image of a first field test in which an exemplary embodiment was implemented. In FIG. 17b, the target appears to be about 5 ft. to left of the velocity vector. The azimuthal smear is still evident. FIG. 17c represents the "anding" of FIGS. 17a and 17b, generated by processing. As is evident from FIG. 17c, the target appears very only slightly left of the velocity vector. Also, there is little smear in the azimuthal resolution.

Figure 18A:
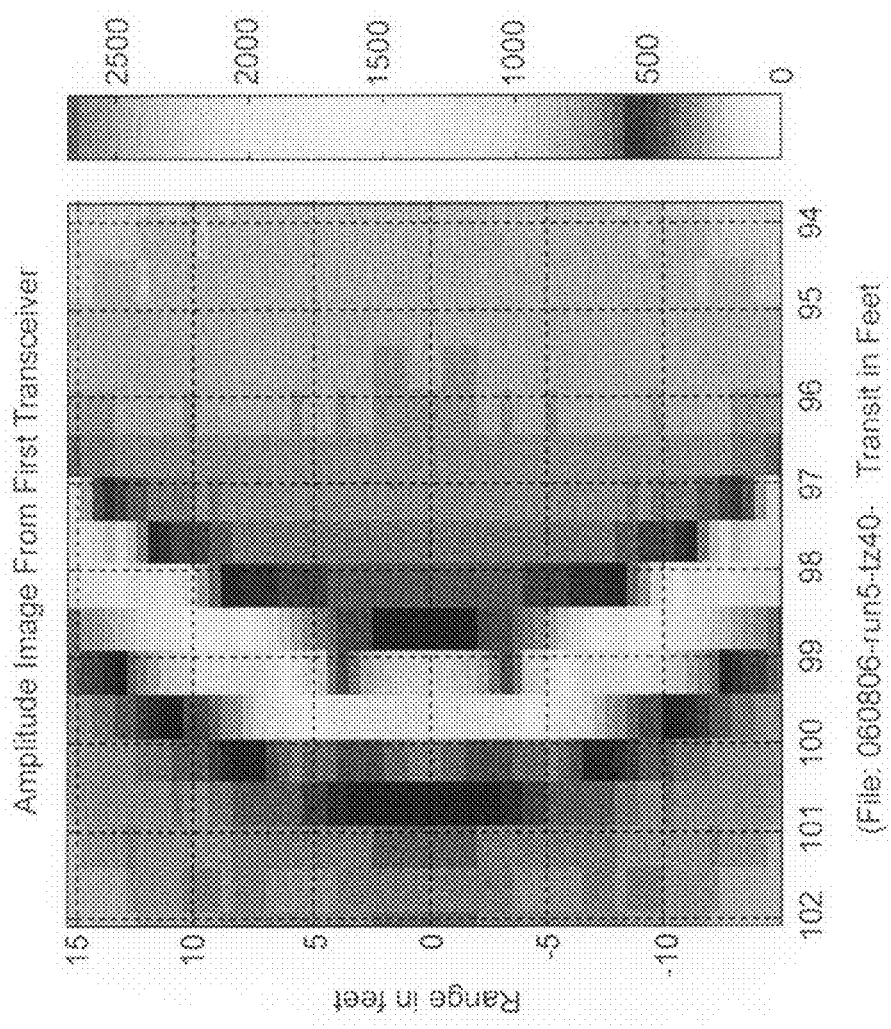
FIG. 18a is a left transceiver amplitude image of a second field test in which an exemplary embodiment was implemented.
Figure 18B:
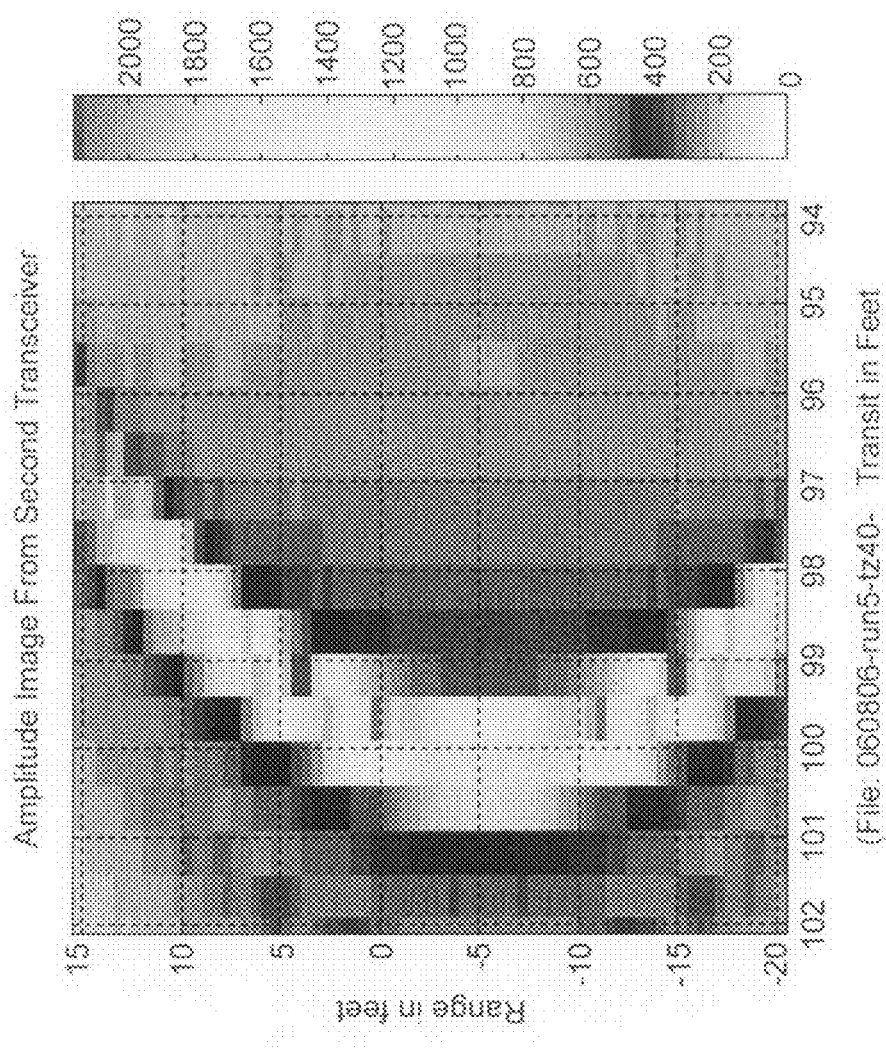
FIG. 18b is a right transceiver amplitude image of a second field test in which an exemplary embodiment was implemented.
Figure 18C:
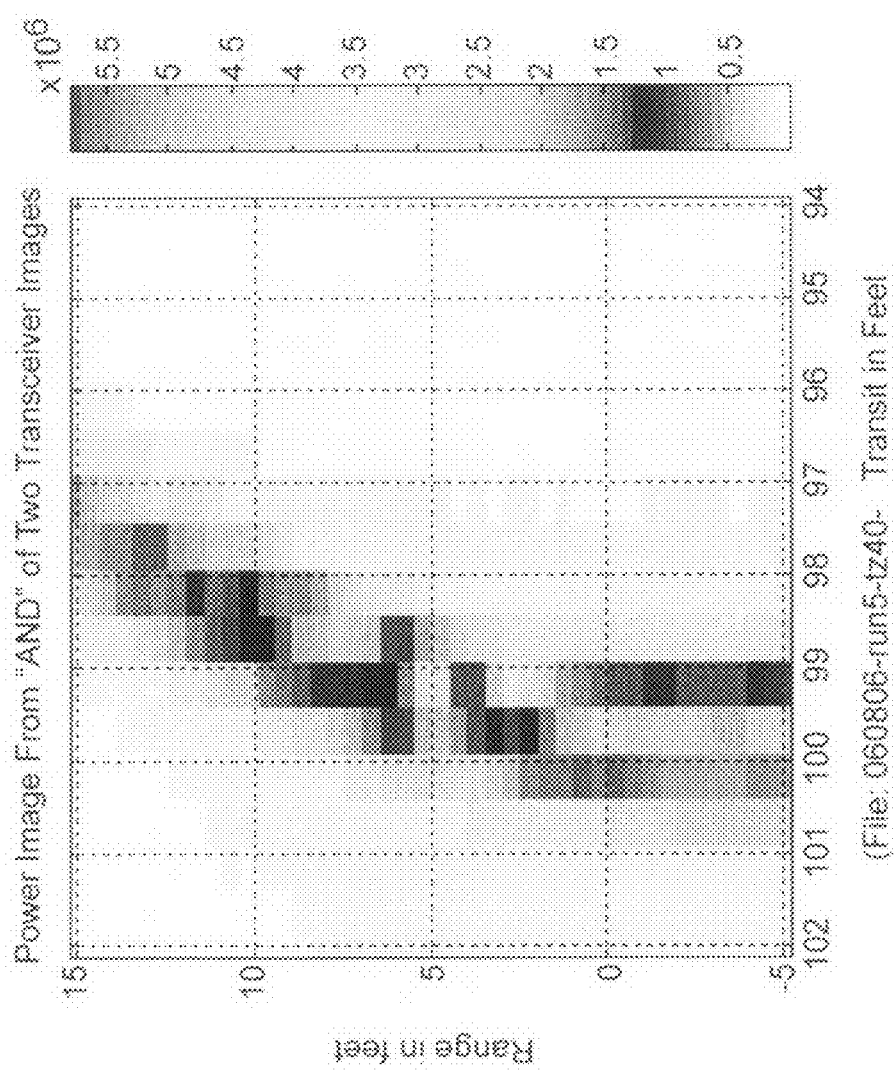
FIG. 18c represents the "anding" of FIGS. 18a and 18b, generated by processing.

The images of FIGS. 17a-c are presented in the power domain; however, it will be appreciated that the present invention is not so limited. For example, although the images of FIGS. 17a-c represent the squaring of the basic magnitude information obtained by the radar antennas, other exponents may be used. Moreover, as shown in FIGS. 18*a-c*, certain exemplary embodiments may function properly in the magnitude domain. In particular, FIG. 18*a* is a left transceiver amplitude image of a second field test in which an exemplary embodiment was implemented. In FIG. 18*a*, the target appears roughly 4 ft. left and right of the velocity vector at a distance of approximately 100 ft. FIG. 18*b* is a right transceiver amplitude image of a second field test in which an exemplary embodiment was implemented. In FIG. 18, the target appears roughly at center, 4 ft. to the right, and 10 and 15 ft. to the left. FIG. 18*c* represents the "anding" of FIGS. 18*a* and 18*b*, generated by processing. As can be appreciated by FIG. 18*c*, a single target now becomes visible approximately 4 ft. to the right of velocity vector.

Figure 19:
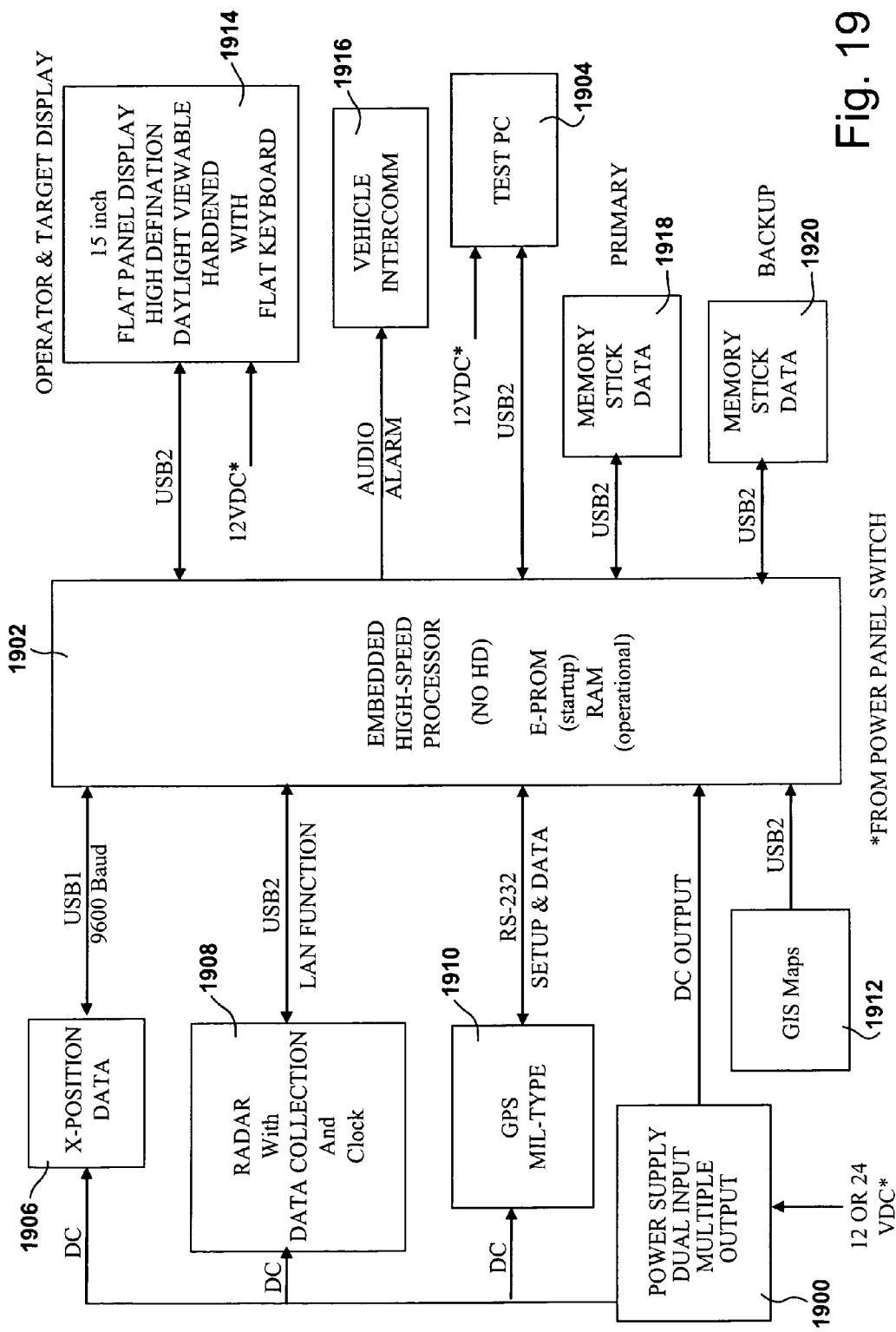
FIG. 19 is a block diagram showing the components of a system built in accordance with an exemplary embodiment.

FIG. 19 is a block diagram showing the components of a system built in accordance with an exemplary embodiment. Generally, the system is powered by a power supply 1900. An embedded, high-speed processor 1902 is provided, and it effectively serves as the coordinating component of the system. The processor 1902 may be connected to, integrated into, or associated with a test computer 1904. The test computer 1904 may be used for, for example, calibration, testing, etc. In early prototypes, distance measuring equipment 1906 included an extra (e.g. fifth) wheel of the vehicle (e.g. dragged behind the vehicle). However, the extra wheel began to skip and thus reduce accuracy when the vehicle reached approximately 10-15 kilometers per hour. Accordingly, certain exemplary embodiments may use an laser ranger finder and/or an optical system. In particular, certain exemplary embodiments use a Datron L400 Optical SPEED Sensor, commercially available from Datron Technology. The radar antenna elements 1908 should be capable of preparing at least 100 files per second. UWB antennas that may be used are available from Next-RF, Inc. These antennas are advantageous because the are small and highly modular (e.g. they may be stacked horizontally and/or vertically). In one exemplary embodiment, two such antennas sit side-by-side to comprise each bistatic pair. In general, the comparative advantages of UWB antennas is described in Schantz, Hans, "The Art and Science of Ultrawideband Antennas," Artech House Publishers, 2005.

Although stock antennas were used for initial tests, later embodiments included custom antennas built to the following specifications by Next-RF. Three basic transmit-receive antenna pairs were designed, constructed, and evaluated, including:

|  | Horizontal Beamwidth | Vertical Beamwidth |
|---|---|---|
| Antenna Design 1 | ~90 degrees | ~30 degrees |
| Antenna Design 2 | ~90 degrees | ~90 degrees |
| Antenna Design 3 | ~45 degrees | ~15 degrees |

These designs incorporated the following general specifications:
 Frequency: ~2-5.7 GHz
 Number of elements: As required for desired beamwidth
 Power: 10 W peak, 1 W average
 Voltage Standing Wave Ratio (VSWR): 2.5:1, or better
 Gain: As required
 Size: Will vary with elements The beamwidth design specification is very aggressive, and it is therefore difficult to guarantee compliance with the pattern specification over the entire bandwidth. The pattern specification should be interpreted as typical for mid-band frequencies, as the pattern is likely to narrow with frequency.

A military-type GPS 1910 and GIS maps 1912 (e.g. available on DVD, thumb drive(s), etc.) may be licensed and/or the hardware, software, etc. may be purchased from off-the-shelf providers. One example of a commercially available GPS system is the Magellan® Meridian® Color GPS system, and one example of a commercially available GIS system is available from Fugawi™.

A display 1914 may be provided to the operator to display video images of the target(s), radar returns, GIS information, overlays of one or more of the same, etc. An audio alarm may be sounded via a vehicle intercom 1916, for example, when a potential threat is detected. One or more memories may be provided for archival purposes, etc. In certain exemplary embodiments, a primary memory 1918 and a backup memory 1920 may be provided, for example, to increase system robustness, survivability, etc.

FIG. 19 shows a number of types of connections. It will be appreciated that the types, locations, speeds, and other characteristics of connections are provided by way of example and without limitation. For example, the USB1 connections may be replaced with USB2 connections, Firewire connections, Ethernet connections, etc.

Figure 20:
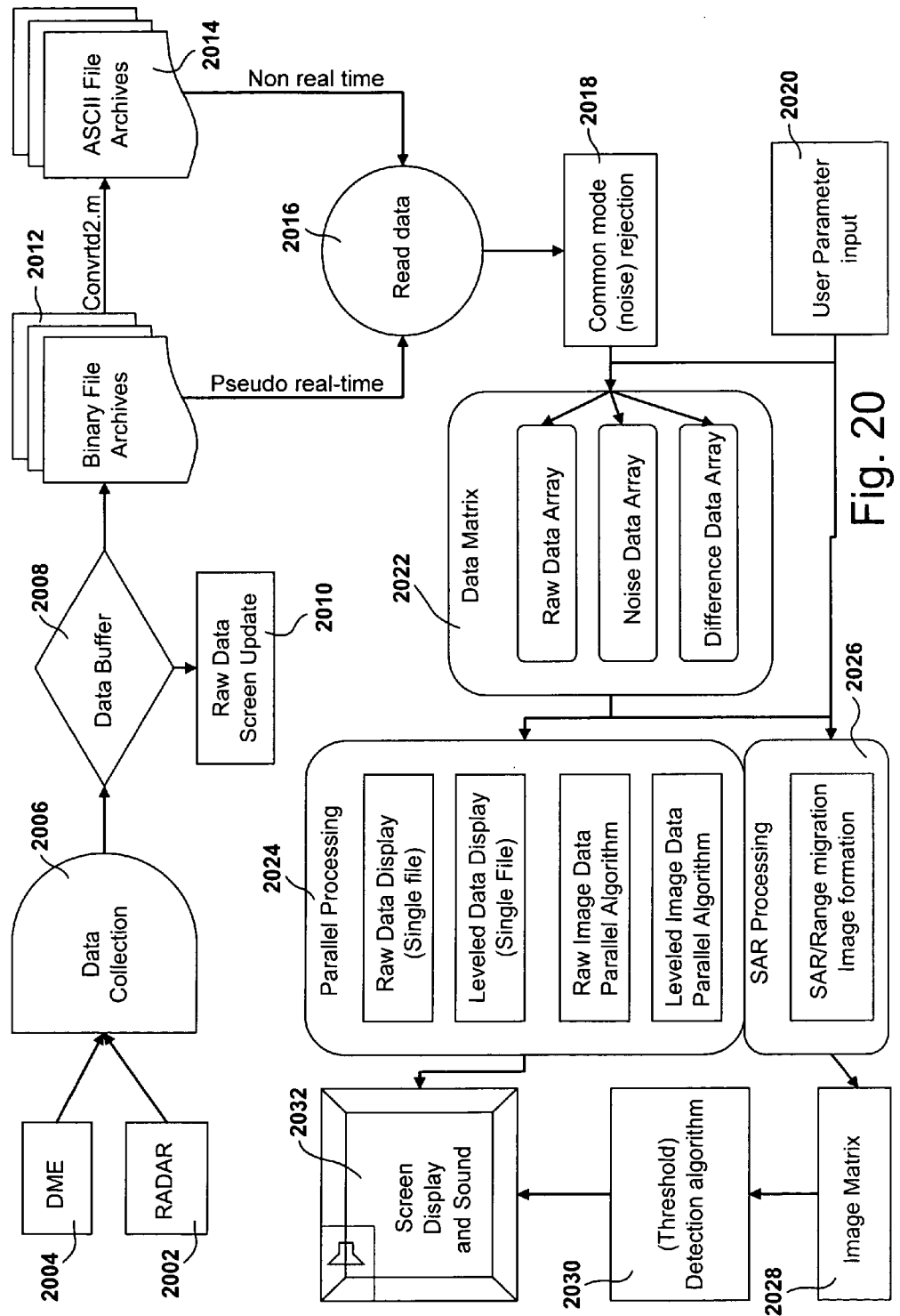
FIG. 20 is a flowchart showing an illustrative method for locating mines and/or IEDs in accordance with an exemplary embodiment.

FIG. 20 is a flowchart showing an illustrative method for locating mines and/or IEDs in accordance with an exemplary embodiment. The radar elements and distance measuring equipment 2004 comprise two sources of information (collected in steps 2004 and 2002, respectively) used in data collection (2006). The DME should be accurate to about 1 in. at a speed of 26 kilometers per hour to obtain a good focus of radar data. This accuracy makes it possible to know the baseline for each radar snapshot. The data is buffered (step 2008), and the operator display is updated with raw data (step 2010). The raw binary data are archived (step 2012) and converted to ASCII files (step 2014), as well. The data is read (step 2016), and noise is rejected (step 2018). The data matrix now comprise raw data, noise data, and difference data arrays (step 2022) based, in part, on the noise rejection (step 2018) and user input (step 2020). Pre-filtering and/or pre-processing also may be performed transparent to the operator at this time. For example, noise data may be subtracted from the raw data to provide cleaner data for processing. Based on parallel processing (step 2024), the data now includes raw data and leveled data, which optionally may be displayed. The data also is processed by a SAR processor (step 2026), which may, for example, form the radar images described above with reference to FIGS. 17*a-c* and 18*a-c*. An image matrix processor may display these radar images (step 2028), and a detection algorithm may help to locate potential targets, for example, by examining the focused data, rejecting clutter, etc. (step 2030). Based on the detection algorithm processing (step 2030) and/or the parallel processing (step 2024), the system may display and/or sound an alert if a threat is detected (step 2032).

As noted above, several algorithm suites were developed to process, analyze, interpret, and display time domain ultrawideband radar data. The radar data should be provided to the program logic implementing the algorithms in its raw form in range-magnitude format. The raw data may be collected from any time-domain UWB radar, including, for example, the Time Domain Corporation (TDC) HAS system's transceiver or other transceivers, such as the Sierra SVA 2, etc. Users also may load archived radar data from anywhere on the host computer and attached peripherals. The figure to the right shows the graphic prompt for data selection. The operational file format and extension used for certain exemplary embodiments is .rtd (for radar testbed data).

Once a data set is selected for study, the first file in the sequence automatically is found, and the file containing the radar parameters as set by the operator at runtime is identified if it is different from the first file in the series. From the collected information, the programs save the radar starting and ending ranges, the gain and integration factors (e.g. pulse information relating sent and received radar transmission), the T-zero settings (e.g. timing information), the selected units, the time and date of the run, the step count, and other parameters as will be apparent to those of ordinary skill in the art.

When analyzing non-real time data sets, the operator can upload a second data set to be used as a reference. The reference data set can be used for various functions depending on, for example, the radar mode, the operational settings, and the options chosen by the operator. For example, the user can compare two scans of similar or identical fields (non-real time); the user can load a previously recorded reference file of the area being surveyed, which also could be used in the implementation of "change detection" wherein the reference data set would then be the original scan of the surveyed area and changes between the reference set load and current scans will be highlighted by the data processing; the averaged stationary clutter noise of the entire data set could be calculated (non-real time), leaving only non-stationary disturbances and allowing the user to maximize the signal-to-clutter ration to improve detection (during real time operation, the total average of clutter noise may be replaced with a moving average that changes along with the radar's field of view); etc.

The operator may specify and/or adjust several settings. Resolution settings, for example, allow the operator to refine the appearance of the SAR image computed from the radar scans. For accurate computation of the SAR image, the operator may set the correct antenna settings, including, for example, boresight and beamwidth angles. The boresight angle is the angle the main axis of symmetry of the antenna makes with the direction of motion. The beamwidth angle is the field of view covered by the antenna within 3 dB on either side of the axis of symmetry. The image below illustrates the option available for boresight and beam width angles.

Prior to starting advance data processing and signal manipulation, the radar operator may set some of the parameters affecting image display and operating mode for the SAR algorithms, referred to herein as rendition settings. Below are descriptions of some of the most frequently used rendition settings:

Color display: "Pseudocolor" displays the data with a range of color from white to red proportional to the strength of the signal with red representing the strongest signal. "Up to white" uses a black and white blend of tone, where white represents the strongest signals. Similarly, with "up to black", the darkest spots represent the strongest signals.

"Amplitude" and "power" options allow the operator to use either the bi-polar amplitude levels of the signal or the power levels to compute the SAR image.

The "search" options allow the operator to highlight returns from objects with a specific shape.

The "scrolling" feature allows the operator to reduce the span of the image displayed on the screen at one time. The size and shape of the covered area also may be manipulated at runtime.

The "AGC" or automatic gain control features are used in combination with automatic detection algorithms to set the trigger levels of the signals generating alarms.

The operator also may choose a range of processing options when analyzing radar data. For example:

The simulation feature allows the operator to simulate the processing of a virtual data set using existing settings.

The "matched filter" feature gives the operator the choice of using, for example, a 3 GHz or 5 GHz center frequency matched filter, or none at all.

The "Post Det Filter" feature offers the possibility of using an RF filter on the filtered data.

The antenna mode options allow the operator to choose between a bistatic setup and a monostatic setup. The monostatic implementation of the SmallSAR radar is used rarely.

The "Cont Scrl Update" feature allows the operator to process the data sequentially, with frequent updates of the SAR image being displayed on the screen simulating the platform movement. In the "No Cont Scrl" mode, the image from the entire data set is computed before any display.

The "Live Update" features allow the operator to process the data in pseudo-real time in HAS (binary) or SS (ASCII) formats.

The "Off Road" features allow the operator to set the maximum cross-range to be computed for the SAR image.

Other run-time options include the "Clutter Rej" function, which sets the level of the radar image's dynamic range that is removed from the display for clarity. It provides the operator with means for removing cluttering colors from the display to focus on targets a few dB above the clutter floor. Although they are not displayed, clutter objects are not erased from the radar returns. The "RngOffs" function sets the radar physical offset as determined during calibration runs. It allows the operator to correct for any range inaccuracies at runtime. The "Range" function shows the maximum radar range, as determined from the parameters loaded for a particular data set. This range is automatically adjusted when the range offset is set. The "Scroll" function allows the operator to move the observation window when the scrolling feature is activated in the rendition settings, as described above.

In general, the processing algorithms are related to the display algorithms. For example, "Scan" links the analysis to the most current data set recorded and/or uploaded, "Ref" links the analysis to a reference data set stored in memory, and "Diff" links the analysis to the optimized difference between the current (Scan) and the reference (Ref) data sets.

Figure 21:
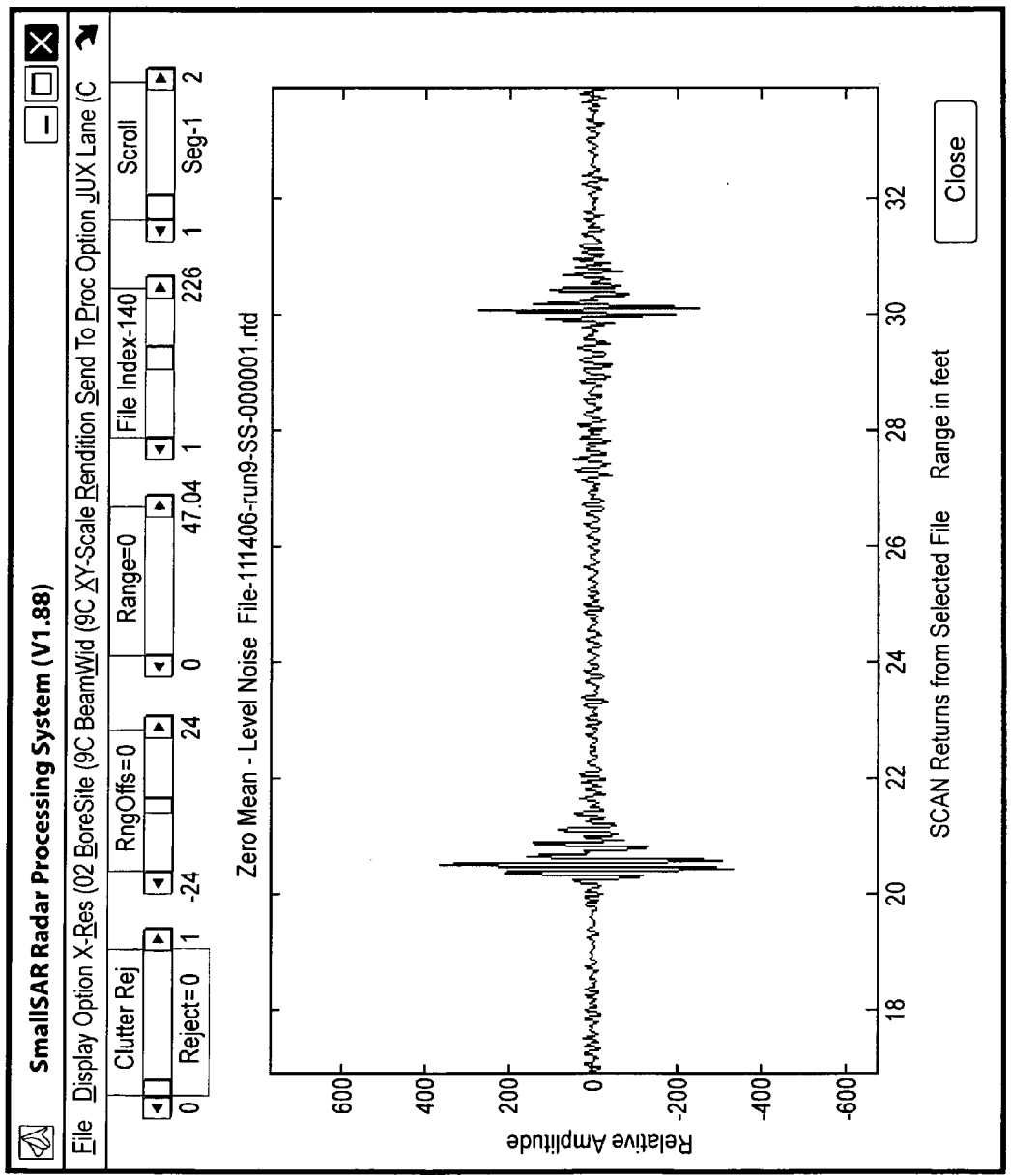
FIG. 21 is an individual radar scan in range-magnitude format with two targets being approximately 10 ft. apart.

FIG. 21 is an individual radar scan in range-magnitude format with two targets being approximately 10 ft. apart. The two targets are both 155 mm projectiles. On the x-axis, the range from the antenna to the target is displayed (in the units chosen in the rendition mode). The y-axis displays the magnitude of the returns. From this display, the range to various targets can be readily detected. However, because the display contains no angle information, the position of the target is ambiguous in bearing. As more files are processed, the operator may manually or automatically screen all the files sequentially. The leveled file data provides a similar display in which the radar scans are brought to a mean value of 0.

Figure 22:
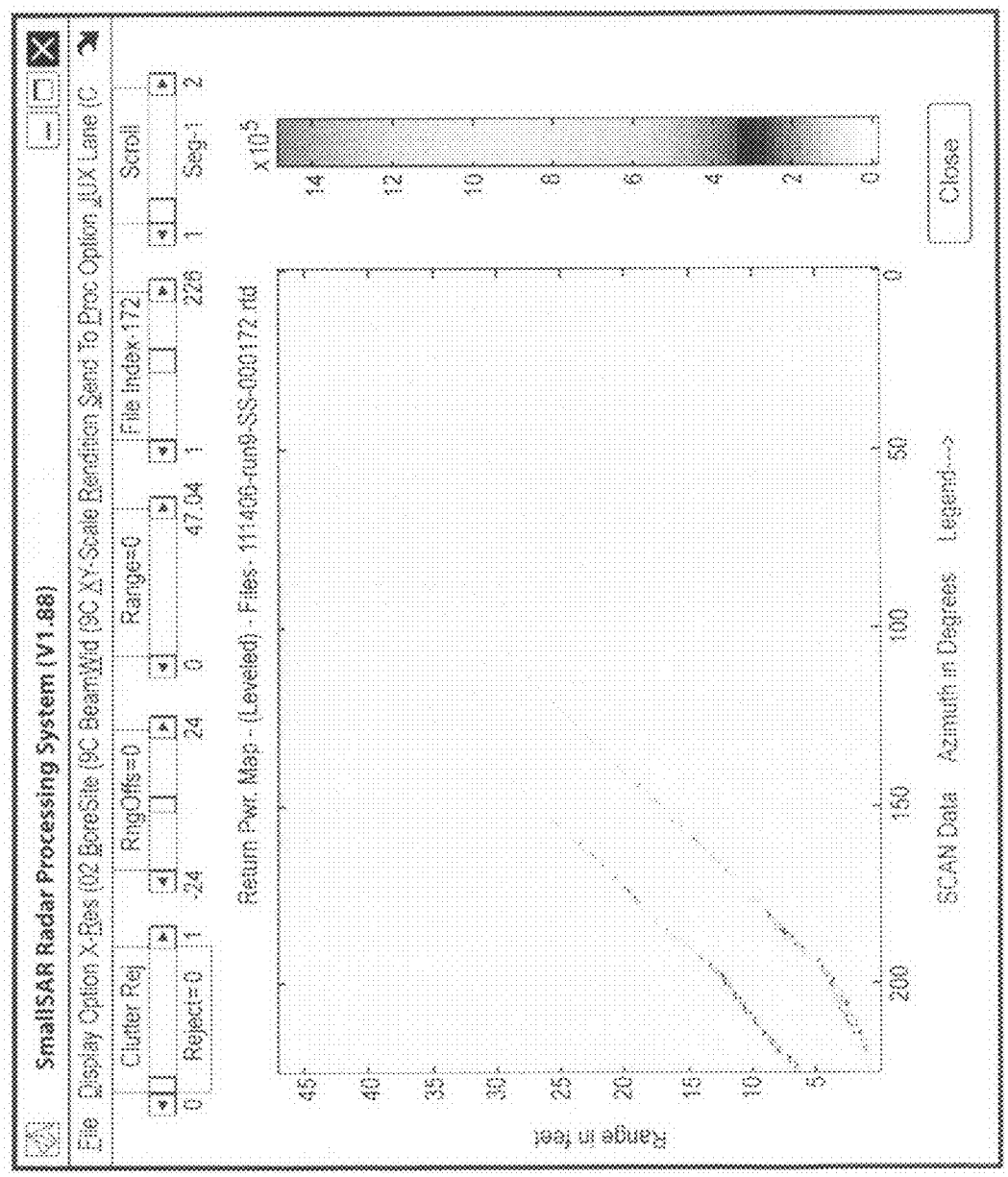
FIG. 22 shows the entire data set (226 files in this case) for a particular run.
Figure 23:
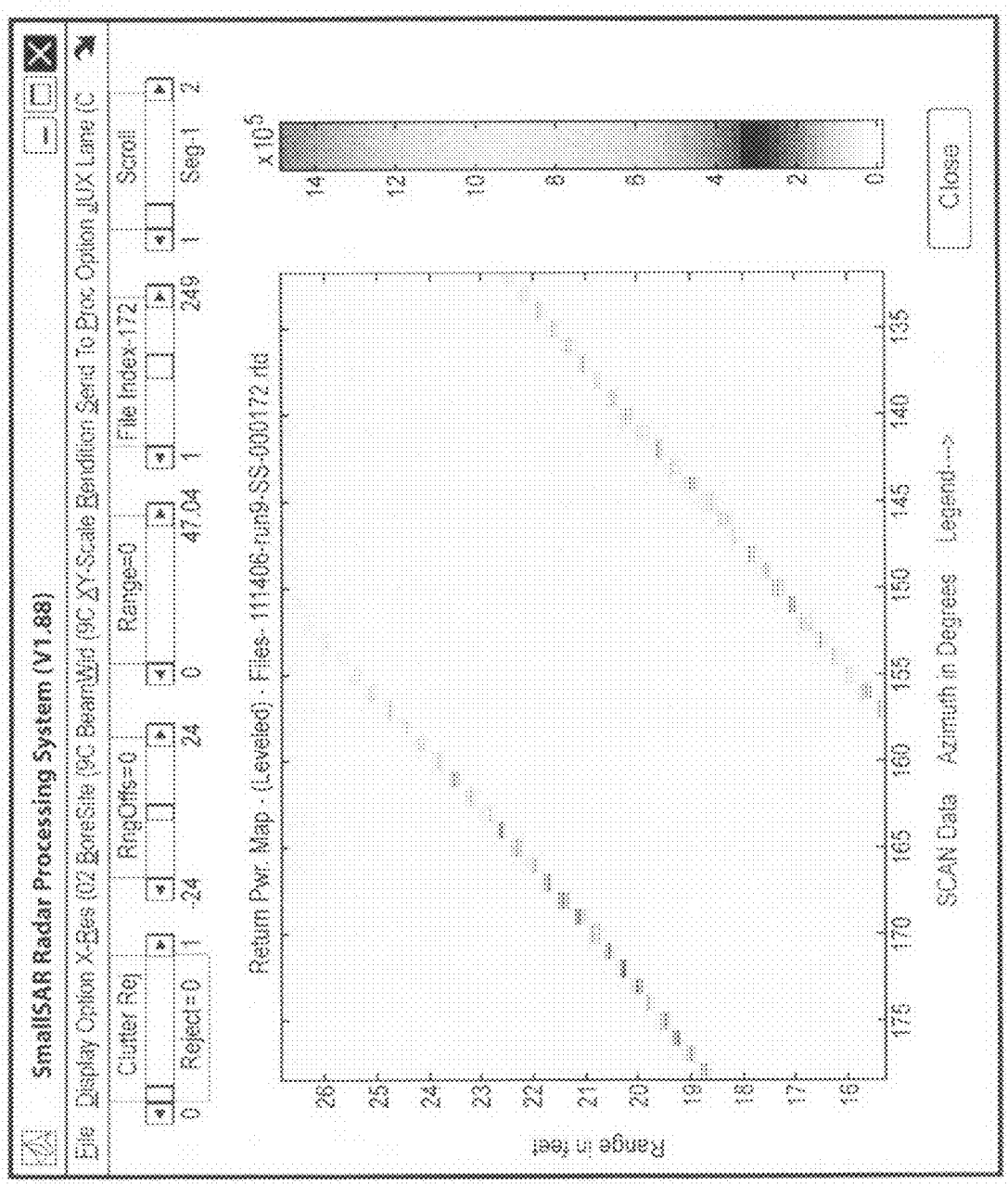
FIG. 23 shows a magnified view of FIG. 22 showing the two target traces.

A raw image data display plots the radar scans in a composite figure in which each column is a radar scan. The x-axis displays the position of the host platform when the scan was taken, essentially representing the traveled path while the y-axis now displays the slant range from the antennas to the target. The amplitude of the radar returns is displayed in a color code set by the color selection in the rendition settings. The figures show an illustration of the raw image algorithm. In particular, FIG. 22 shows the entire data set (226 files in this case) for a particular run. FIG. 23 shows a magnified view of FIG. 22 showing the two target traces. In FIG. 23, the columns of data are more visible. Each column represents a scan of data. This allows the operator to monitor a wider view of the area being surveyed and track multiple targets as they enter and exit the radar's field of view.

Figure 24:
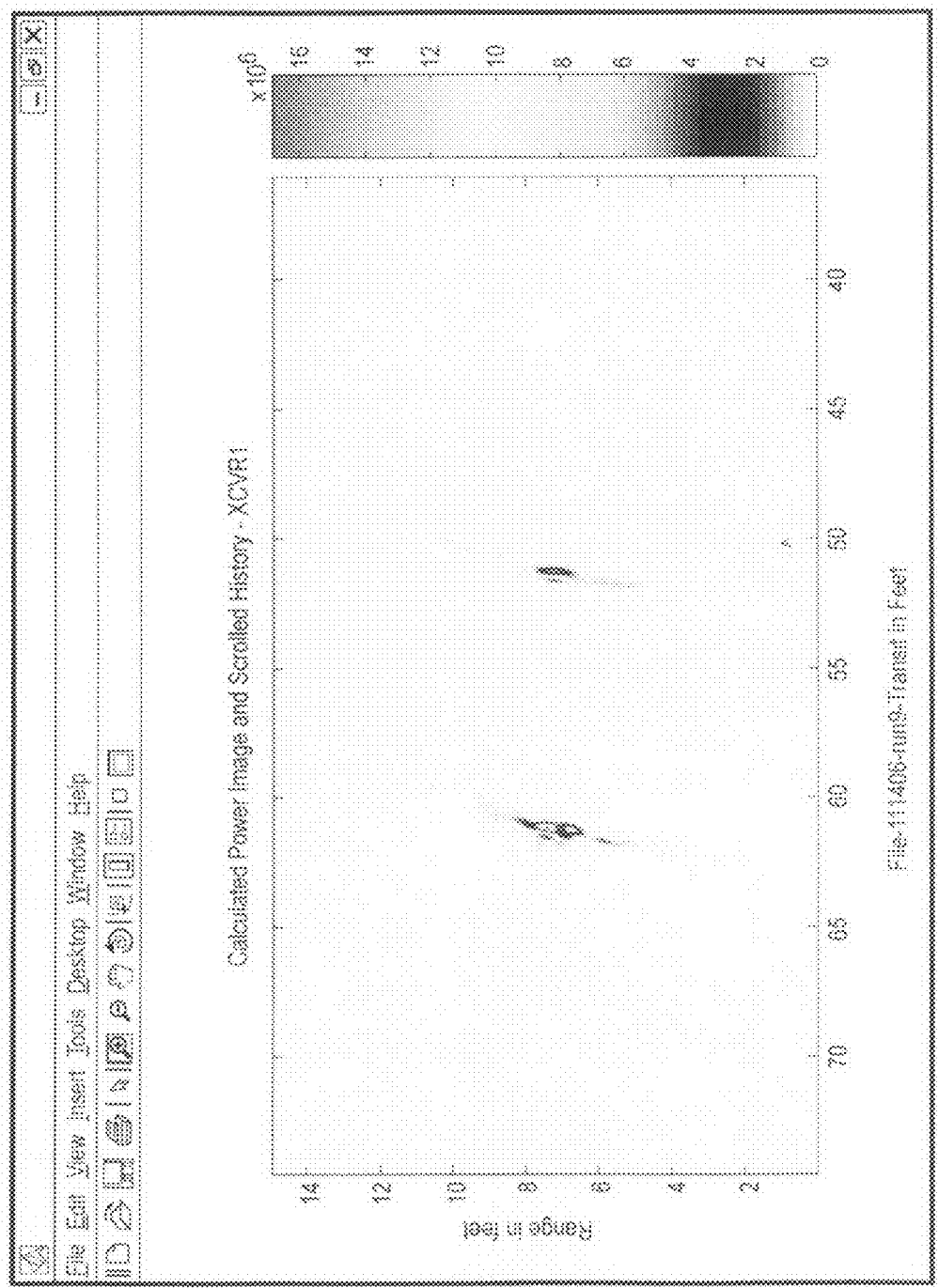
FIG. 24 is an X-transit (e.g. focused) image, which is the result of the combination between the SAR properties of the radar and the range migration algorithm that results in a two-dimensional image of the area being surveyed; and, FIG. 25 is a flowchart illustrating a process for detecting landmines and/or IEDs in accordance with an exemplary embodiment.

FIG. 24 is an X-transit (e.g. focused) image, which is the result of the combination between the SAR properties of the radar and the range migration algorithm that results in a two-dimensional image of the area being surveyed. The x-axis represents the distance along the direction of motion of the host vehicle, and the y-axis represents that range across, perpendicular to the direction of motion. The slant ranges have been eliminated to provide a more "natural" bird's eye or plan view of the area being surveyed. FIG. 24 is the result from a test run with a strong target at about 62 ft. down range and about 7 ft. across, and a weaker target at about 52 ft. down range and 7 ft. across.

For two channel operation, each channel's data is processed with the same methodology as described above. Each resulting SAR image is referenced to the baseline position of the corresponding-antenna. The two baselines currently used are approximately 5-6 ft. apart and are assumed to be straight and parallel. The overlapping areas are then added and normalized to produce the final image (e.g. they are "anded").

Figure 25:
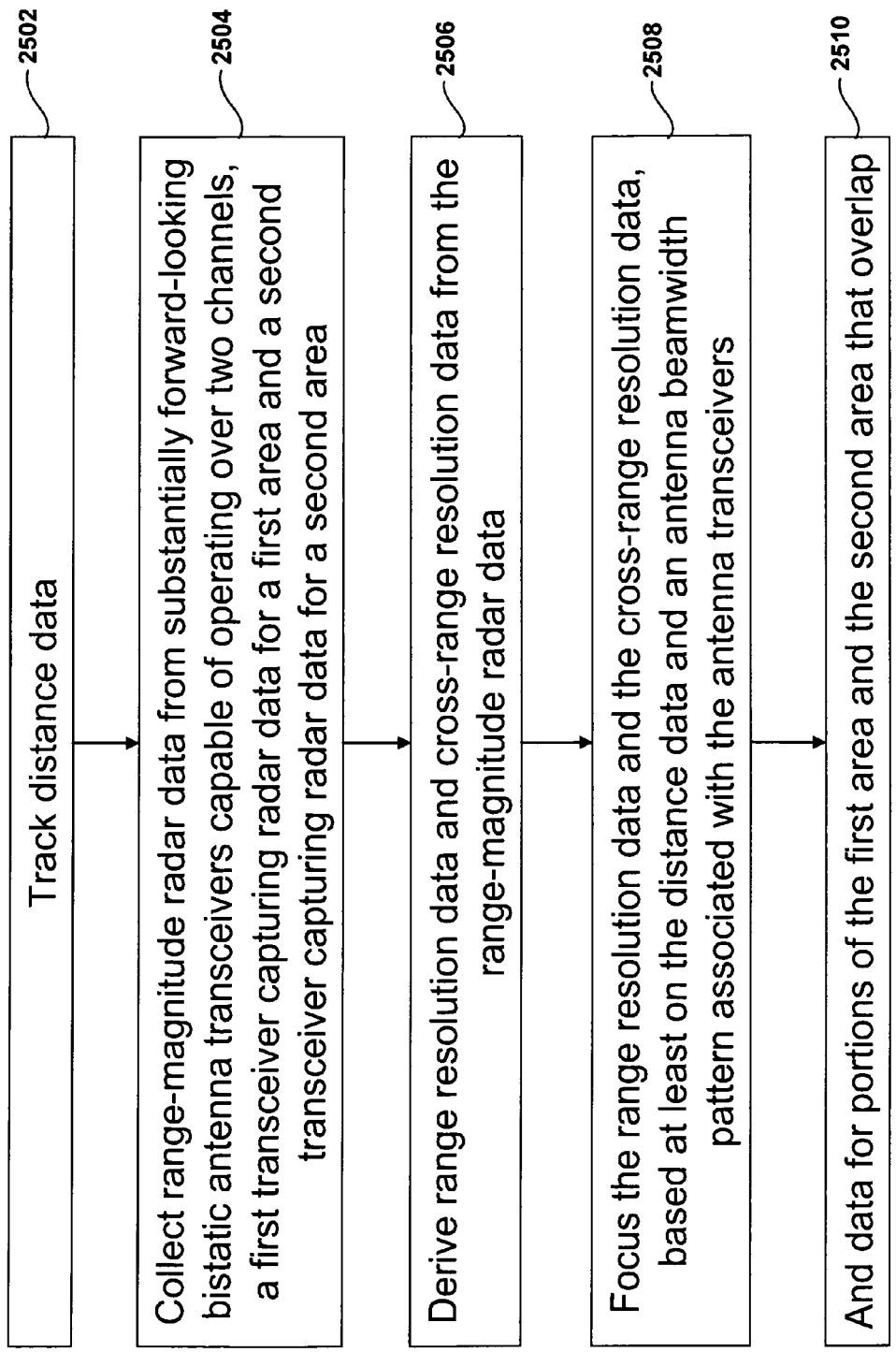

FIG. 25 is a flowchart illustrating a process for detecting landmines and/or IEDs in accordance with an exemplary embodiment. In step 2502, distance data is tracked. Range-magnitude radar data is collected from substantially forward-looking bistatic antenna transceivers capable of operating over two channels, a first transceiver capturing radar data for a first area and a second transceiver capturing radar data for a second area in step 2504. Range resolution data and cross-range resolution data are derived from the range-magnitude radar data in step 2506. In step 2508, the range resolution data and the cross-range resolution data is focused, based at least on the distance data and an antenna beamwidth pattern associated with the antenna transceivers. In step 2510, data for portions of the first area and the second area that overlap are anded. This data may be colorized and/or displayed based on the strength of the returned radar data.

It will be appreciated that modifications to the gathering and focusing algorithms may be necessary based, in part, on different antennas, antenna types, and/or antenna configurations. For example, the algorithms may need to be adjusted based on look angle, aperture, gain, baseline distance, etc. Such modifications to the basic trigonometric calculations should be apparent to those of ordinary skill in the art. For example, for a purely side-looking ground penetrating radar with antennas with wide azimuthal beamwidth (e.g. approximately 60-90 degrees) and relatively wide elevation beamwidth (e.g. approximately 20-45 degrees), those antennas are oriented approximately 90 degrees from the direction of motion. Certain exemplary embodiments of the off-road, non-buried mine detector may use antennas with much narrower azimuthal beamwidth (e.g. approximately 45 degrees) and elevation beamwidth (e.g. approximately 15 degrees) and are oriented at an acute angle from the direction of motion (usually approximately 22.5 to 45 degrees). From one configuration to the next, the signal analyst may have to account for the antenna effect. Such factors may include, for example, the boresight (orientation) angle, the change in beamwidth, the variation in gain, etc. Those factors, in turn, generally specify the radar's field of view that will be use in the focusing algorithm. The range accuracy essentially remains the same, but the resolution both in range and azimuth are related to the radar's field of view, the boresight angle, and the observation range chosen for the particular scenario, because those terms generally determine how long a given target will contribute to radar raw returns. In the case of a forward-looking scenario, for example, targets generally are within the field of view for a shorter period of time, and the algorithms have to account for the loss in overall raw returns and the resulting lower signal-to-noise ratio.

Certain exemplary embodiments may convey a number of advantages to operators of the systems. For example, the probability of detecting a target is extremely high. The probability of a false alarm initially may be high in a clutter rich environment (e.g. an environment having a large amount of trash, rocks, cans, etc.). However, the range resolution (of 3 in. in certain exemplary embodiments) may help to discriminate between targets and false alarms. Various clutter rejection algorithms may be developed to aid operators.

It will be appreciated that the present invention is not limited to either polarized or fully polarimetric techniques for radar returns. When polarized techniques are used, experiments have indicated that polarizing along the horizontal-horizontal (HH) domain for send and receive appears to work best. However, when the radar returns hit the atmosphere, only a portion of the data returns are received. Fully polarimetric techniques may be implemented in certain exemplary embodiments to receive substantially all of the radar returns. Any or all of the eight possibilities (i.e. HH, HV, VV, VH, RR, RL, LR, LL) for partial or fully polarimetric techniques may be used. Such techniques may be used to improve SNR and resolution. Thus, discrimination of targets also may be improved correspondingly.

Although certain exemplary embodiments are described with reference to radar systems disposed on trucks, the present invention is not limited to any particular type of vehicle. For example, as used herein, the term "vehicle" is broad enough to encompass, for example, any type of vehicle that could be used on land, in air, or in water. Land-based vehicles may include, for example, cars, trucks, jeeps, tanks, specially configured sweeping devices, etc. Air-based vehicles may include, for example, low- and/or high-altitude aircraft, helicopters, etc. Water-based vehicles may include, for example, any type of vessel suitable for at least partially amphibious travel. Any of these vehicles may be armored or unarmored, and the amount of armoring may vary. Also, any of these vehicles may be manned or unmanned. In certain unmanned exemplary embodiments (e.g. in an unmanned aerial vehicle or UAV), an operator may be replaced by an automated system that is, for example, capable of marking potential threats, calling for help, etc. Alternatively, or in addition, an operator may be located remote from the vehicle and/or may control certain operations from the remote location. Commands may be communicated wirelessly to one or more off-site operators and/or monitoring stations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of detecting mines and/or improvised explosive devices, the method comprising:
    tracking distance data;
    collecting range-magnitude radar data from substantially forward-looking bistatic antenna transceivers capable of operating over two channels, a first transceiver capturing radar data for a first area and a second transceiver capturing radar data for a second area;

deriving range resolution data and cross-range resolution data from the range-magnitude radar data;

focusing the range resolution data and the cross-range resolution data, based at least on the distance data and an antenna beamwidth pattern associated with the antenna transceivers; and, anding data for portions of the first area and the second area that overlap.

2. The method of claim 1, further comprising displaying the result of the focusing step.

3. The method of claim 1, further comprising colorizing the display based at least on the radar data strength.

4. The method of claim 1, wherein the radar data is fully polarimetric.

5. The method of claim 1, wherein the distance data is tracked with a laser rangefinder.

6. The method of claim 1, wherein the antenna transceivers are disposed at angles approximately 10-45 degrees away from the forward-looking direction.

7. The method of claim 1, wherein the antenna transceivers are disposed at an angle approximately 22.5 degrees away from the forward-looking direction.

8. The method of claim 1, wherein the antenna transceiver range resolution is 0.015 ft.

9. A system for detecting mines and/or improvised explosive devices, comprising:

distance measuring equipment configured to track movement of the system;

substantially forward-looking bistatic antenna transceivers capable of collecting range-magnitude radar data over two channels, including a first transceiver capturing radar data for a first area and a second transceiver capturing radar data for a second area; and, a processor configured to:

derive range resolution data and cross-range resolution data from the range-magnitude radar data;

focus the range resolution data and the cross-range resolution data, based at least on the distance data and an antenna beamwidth pattern associated with the antenna transceivers; and, combining and anding data for portions of the first area and the second area that overlap.

10. The system of claim 9, further comprising a display configured to output the result of the focusing step.

11. The system of claim 9, wherein the processor is further operable to colorize focused radar data based at least on the radar data strength.

12. The system of claim 9, wherein the antenna transceivers are partially or fully polarimetric.

13. The system of claim 9, wherein the distance measuring equipment is a laser rangefinder.

14. The system of claim 9, wherein the antenna transceivers are disposed at angles approximately 10-45 degrees away from the forward-looking direction.

15. The system of claim 9, wherein the antenna transceivers are disposed at an angle approximately 22.5 degrees away from the forward-looking direction.

16. The system of claim 9, wherein the antenna transceiver range resolution is 0.015 ft.

17. The system of claim 9, further comprising a video camera.

18. The system of claim 9, wherein the distance measuring equipment and the antenna transceivers are collocated.

19. The system of claim 9, wherein mines and/or improvised explosive devices can be detected at a standoff distance of approximately 300 ft. while traveling at approximately 25 kilometers per hour.

20. The system of claim 9, wherein the system is capable of being disposed on a vehicle that is land-, air-, and/or water-based.

* * * * *